US012613568B2

(12) United States Patent
Chebbi et al.

(10) Patent No.: US 12,613,568 B2
(45) Date of Patent: Apr. 28, 2026

(54) POWER STATE MANAGEMENT FOR SYSTEM-ON-CHIP

(71) Applicant: QUALCOMM Incorporated, San Diego, CA (US)

(72) Inventors: Shriharsha Chebbi, Hyderabad (IN); Lakshmi Narayana Panuku, Hyderabad (IN); Prashanth Kumar Kakkireni, Bengaluru (IN); Arun Gothekar, Hyderabad (IN); Anirudh Ghayal, Secunderabad (IN); Sriram Hariharan, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 93 days.

(21) Appl. No.: 18/670,526

(22) Filed: May 21, 2024

(65) Prior Publication Data

US 2025/0362733 A1　　Nov. 27, 2025

(51) Int. Cl.
*G06F 1/00*　　(2006.01)
*G06F 1/3206*　　(2019.01)
*G06F 1/3296*　　(2019.01)

(52) U.S. Cl.
CPC .......... *G06F 1/3296* (2013.01); *G06F 1/3206* (2013.01)

(58) Field of Classification Search
CPC ............................. G06F 1/3296; G06F 1/3206
See application file for complete search history.

(56) References Cited

U.S. PATENT DOCUMENTS

| | | | |
|---|---|---|---|
| 9,190,989 B1 * | 11/2015 | Sharda ...................... | G05F 1/66 |
| 10,147,464 B1 * | 12/2018 | Wen ................... | G06F 11/3024 |
| 12,440,386 B1 * | 10/2025 | Mas .......................... | A61F 9/04 |
| 2019/0094949 A1 | 3/2019 | Kurian et al. | |
| 2019/0187770 A1 | 6/2019 | Severino et al. | |
| 2022/0317757 A1 * | 10/2022 | Rao ....................... | G06F 1/3206 |
| 2023/0014569 A1 | 1/2023 | Luban et al. | |
| 2023/0309992 A1 * | 10/2023 | Leimbach ............ | H02H 7/1213 |
| | | | 227/180.1 |

OTHER PUBLICATIONS

International Search Report and Written Opinion—PCT/US2025/023664—ISA/EPO—Jul. 16, 2025 (2400382WO).

* cited by examiner

*Primary Examiner* — Xuxing Chen
(74) *Attorney, Agent, or Firm* — Norton Rose Fulbright US LLP

(57) ABSTRACT

This disclosure provides systems, methods, and devices for power state transitions with multiple chiplets. In a first aspect, a method of image processing includes receiving an indication to enter a partial sleep state for a processor comprising a first main domain and a first separate domain coupled through a different power supply path than the first main domain; and in response to the indication, transitioning, by the processor, the first main domain to a sleep state while the first separate domain remains in an active state for receiving processing requests or monitoring the first main domain. Other aspects and features are also claimed and described.

17 Claims, 14 Drawing Sheets

| Primary Chiplet | Secondary Chiplet | | | | | |
|---|---|---|---|---|---|---|
| | Active | Island | Sleep | DeepSleep (MD DeepSleep, EII active/sleep) | DeepSleep (MD DeepSleep, EII OFF) | OFF |
| Active | Yes | N/A | Yes transition/debug state | No | No | Yes Transition from Secondary crash |
| Island | No | N/A | Yes | No | No | No |
| Sleep | No | N/A | Yes Yields to AOSS Sleep | No | No | No |
| Shallow Sleep (MD DeepSleep, EII active/sleep) | No | N/A | No | No | Yes | No |
| Shallow Sleep (MD DeepSleep, EII OFF) | No | N/A | No | Yes | Yes | No |
| Safety-Only (MD Off, EII active) | No | N/A | No | No | No | Yes |
| OFF | No | N/A | No | No | No | Yes |

FIG. 5

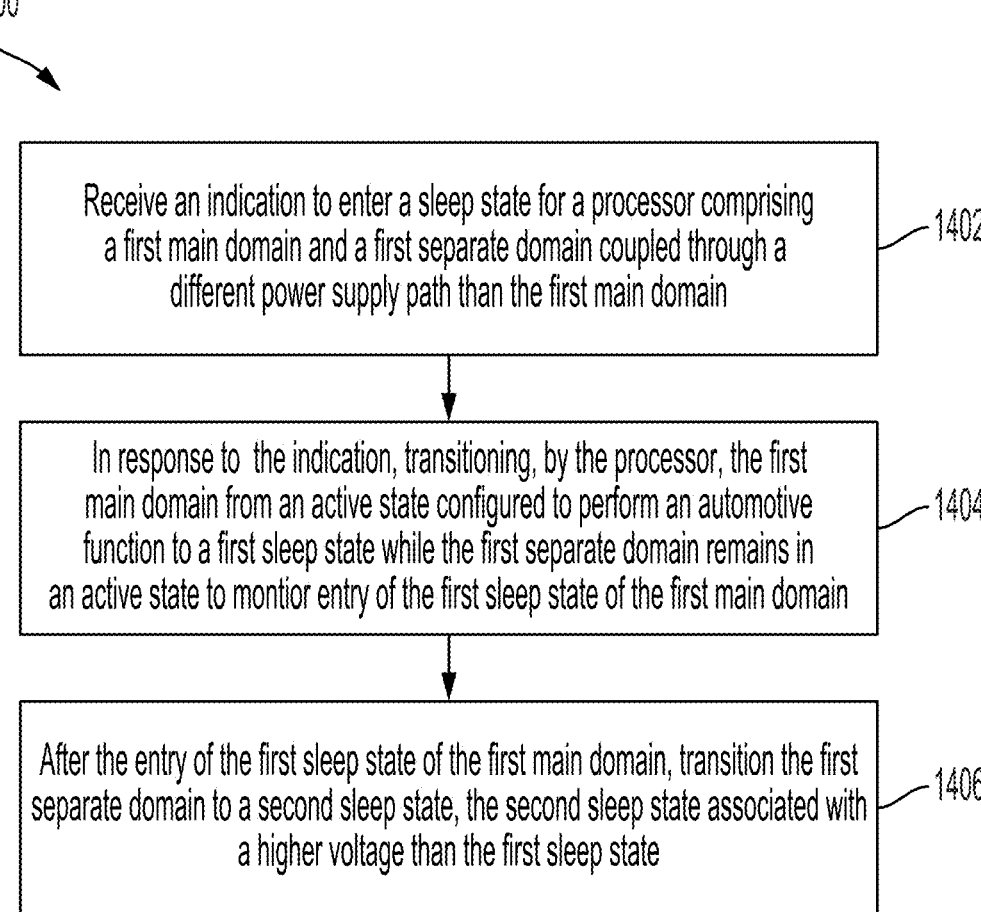

1400

Receive an indication to enter a sleep state for a processor comprising a first main domain and a first separate domain coupled through a different power supply path than the first main domain — 1402

In response to the indication, transitioning, by the processor, the first main domain from an active state configured to perform an automotive function to a first sleep state while the first separate domain remains in an active state to montior entry of the first sleep state of the first main domain — 1404

After the entry of the first sleep state of the first main domain, transition the first separate domain to a second sleep state, the second sleep state associated with a higher voltage than the first sleep state — 1406

FIG. 14

POWER STATE MANAGEMENT FOR SYSTEM-ON-CHIP

TECHNICAL FIELD

Aspects of the present disclosure relate generally to power state management, and more particularly, to methods and systems suitable for power management of multiple domains in a system-on-chip (SoC).

INTRODUCTION

Vehicle technologies have grown rapidly over the past decades. This growth has been fueled by automated and electrified systems and machines in the vehicles. These machines have enabled transmission control, wireless communications, tracking control, adaptive cruise control, lane change assistance, collision avoidance, night vision, parking assistance, and blind spot detection. Vehicles contain batteries and manage power to support the systems and machines. As research into vehicle automation has progressed, the power management systems have been developed and advanced.

BRIEF SUMMARY OF SOME EXAMPLES

The following summarizes some aspects of the present disclosure to provide a basic understanding of the discussed technology. This summary is not an extensive overview of all contemplated features of the disclosure and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

In some aspects, a processor may include a main domain and a separate domain coupled through a different power supply path than the main domain. The processor may transition the multiple domains of a chiplet to different power states. For example, when the processor receives an indication to enter a partial state (e.g., a shallow sleep state), the processor may isolate the separate domain from the main domain and transition the main domain into the sleep state while the separate domain remains in the active state for receiving processing requests or monitoring the main domain. Although the main domain is in the sleep state or a low power state, the separate domain may independently monitor the main domain, process processing requests, or perform an automotive function. Thus, the processor may consume less energy and at the same time keep maintaining the health of the processor due to the separate domain with the active state. Also, the active, separate domain may respond to issues in the main domain in real time or near real time without using a cold boot or quick boot. Further, the active, separate domain may maintain communications with an external microcontroller unit and provide the status of the processor, even if the main domain is in the low power state.

In further aspects, the processor may include a primary chiplet and a secondary chiplet. The primary chiplet may operate as a master, and power states of the secondary chiplet may be determined in correspondence to the power states of the primary chiplet. For example, when the primary chiplet is in the partial sleep state (i.e., the main domain is in the sleep state while the separate domain is in the active state or the sleep state), the main domain of the secondary chiplet may be in the sleep sate and the separate domain of the secondary chiplet may be in the off state. Thus, the power states of multiple chiplets are efficiently managed and determined in real time or near real time because valid power states of the secondary chiplet are determined in correspondence to the primary chiplet.

In one aspect of the disclosure, a method comprises: receiving an indication to enter a sleep state for at least one processor comprising a first main domain and a first separate domain coupled through a different power supply path than the first main domain; in response to the indication, transitioning, by the at least one processor, the first main domain from an active state configured to perform an automotive function to the first sleep state while the first separate domain remains in the active state to monitor entry of the first sleep state of the first main domain; and after the entry of the first sleep state of the first main domain, transitioning the first separate domain in a second sleep state, the second sleep state associated with a higher voltage than the first sleep state.

In an additional aspect of the disclosure, an apparatus includes at least one processor and a memory coupled to the at least one processor including a first main domain and a first separate domain coupled through a different power supply path than the first main domain. The at least one processor is configured to execute the processor-readable code to cause the at least one processor to perform operations including: receiving an indication to enter a sleep state for the at least one processor; in response to the indication, transitioning the first main domain from an active state configured to perform an automotive function to the first sleep state while the first separate domain remains in the active state to monitor entry of the first sleep state of the first main domain; and after the entry of the first sleep state of the first main domain, transitioning the first separate domain in a second sleep state, the second sleep state associated with a higher voltage than the first sleep state.

In an additional aspect of the disclosure, a non-transitory computer-readable medium stores instructions that, when executed by a processor, cause the processor to perform operations. The operations include receiving an indication to enter a sleep state for at least one processor comprising a first main domain and a first separate domain coupled through a different power supply path than the first main domain; in response to the indication, transitioning, by the at least one processor, the first main domain from an active state configured to perform an automotive function to the first sleep state while the first separate domain remains in the active state to monitor entry of the first sleep state of the first main domain; and after the entry of the first sleep state of the first main domain, transitioning the first separate domain in a second sleep state, the second sleep state associated with a higher voltage than the first sleep state.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

In various implementations, the techniques and apparatus may be used for wireless communication networks such as code division multiple access (CDMA) networks, time division multiple access (TDMA) networks, frequency division multiple access (FDMA) networks, orthogonal FDMA (OFDMA) networks, single-carrier FDMA (SC-FDMA) ng networks, LTE networks, GSM networks, 5th Generation (5G) or new radio (NR) networks (sometimes referred to as "5G NR" networks, systems, or devices), as well as other communications networks. As described herein, the terms "networks" and "systems" may be used interchangeably.

A CDMA network, for example, may implement a radio technology such as universal terrestrial radio access (UTRA), cdma2000, and the like. UTRA includes wideband-CDMA (W-CDMA) and low chip rate (LCR). CDMA2000 covers IS-2000, IS-95, and IS-856 standards.

A TDMA network may, for example implement a radio technology such as Global System for Mobile Communication (GSM). The 3rd Generation Partnership Project (3GPP) defines standards for the GSM EDGE (enhanced data rates for GSM evolution) radio access network (RAN), also denoted as GERAN. GERAN is the radio component of GSM/EDGE, together with the network that joins the base stations (for example, the Ater and Abis interfaces) and the base station controllers (A interfaces, etc.). The radio access network represents a component of a GSM network, through which phone calls and packet data are routed from and to the public switched telephone network (PSTN) and Internet to and from subscriber handsets, also known as user terminals or user equipments (UEs). A mobile phone operator's network may comprise one or more GERANs, which may be coupled with UTRANs in the case of a UMTS/GSM network. Additionally, an operator network may also include one or more LTE networks, or one or more other networks. The various different network types may use different radio access technologies (RATs) and RANs.

An OFDMA network may implement a radio technology such as evolved UTRA (E-UTRA), Institute of Electrical and Electronics Engineers (IEEE) 802.11, IEEE 802.16, IEEE 802.20, flash-OFDM and the like. UTRA, E-UTRA, and GSM are part of universal mobile telecommunication system (UMTS). In particular, long term evolution (LTE) is a release of UMTS that uses E-UTRA. UTRA, E-UTRA, GSM, UMTS and LTE are described in documents provided from an organization named "3rd Generation Partnership Project" (3GPP), and cdma2000 is described in documents from an organization named "3rd Generation Partnership Project 2" (3GPP2). 5G networks include diverse deployments, diverse spectrum, and diverse services and devices that may be implemented using an OFDM-based unified, air interface.

The present disclosure may describe certain aspects with reference to LTE, 4G, or 5G NR technologies; however, the description is not intended to be limited to a specific technology or application, and one or more aspects described with reference to one technology may be understood to be applicable to another technology. Additionally, one or more aspects of the present disclosure may be related to shared access to wireless spectrum between networks using different radio access technologies or radio air interfaces.

Devices, networks, and systems may be configured to communicate via one or more portions of the electromagnetic spectrum. The electromagnetic spectrum is often subdivided, based on frequency or wavelength, into various classes, bands, channels, etc. In 5G NR two initial operating bands have been identified as frequency range designations FR1 (410 MHz-7.125 GHz) and FR2 (24.25 GHz-52.6 GHz). The frequencies between FR1 and FR2 are often referred to as mid-band frequencies. Although a portion of FRI is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" (mmWave) band in documents and articles, despite being different from the extremely high frequency (EHF) band (30 GHz-300 GHz) which is identified by the International Telecommunications Union (ITU) as a "mm Wave" band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "mmWave" or the like if used herein may broadly represent frequencies that may include mid-band frequencies, may be within FR2, or may be within the EHF band.

5G NR devices, networks, and systems may be implemented to use optimized OFDM-based waveform features. These features may include scalable numerology and transmission time intervals (TTIs); a common, flexible framework to efficiently multiplex services and features with a dynamic, low-latency time division duplex (TDD) design or frequency division duplex (FDD) design; and advanced wireless technologies, such as massive multiple input, multiple output (MIMO), robust mmWave transmissions, advanced channel coding, and device-centric mobility. Scalability of the numerology in 5G NR, with scaling of subcarrier spacing, may efficiently address operating diverse services across diverse spectrum and diverse deployments. For example, in various outdoor and macro coverage deployments of less than 3 GHZ FDD or TDD implementations, subcarrier spacing may occur with 15 kHz, for example over 1, 5, 10, 20 MHz, and the like bandwidth. For other various outdoor and small cell coverage deployments of TDD greater than 3 GHz, subcarrier spacing may occur with 30 kHz over 80/100 MHz bandwidth. For other various indoor wideband implementations, using a TDD over the unlicensed portion of the 5 GHz band, the subcarrier spacing may occur with 60 kHz over a 160 MHz bandwidth. Finally, for various deployments transmitting with mmWave components at a TDD of 28 GHz, subcarrier spacing may occur with 120 kHz over a 500 MHz bandwidth.

For clarity, certain aspects of the apparatus and techniques may be described below with reference to example 5G NR implementations or in a 5G-centric way, and 5G terminology may be used as illustrative examples in portions of the description below; however, the description is not intended to be limited to 5G applications.

Moreover, it should be understood that, in operation, wireless communication networks adapted according to the concepts herein may operate with any combination of licensed or unlicensed spectrum depending on loading and availability. Accordingly, it will be apparent to a person having ordinary skill in the art that the systems, apparatus and methods described herein may be applied to other communications systems and applications than the particular examples provided.

While aspects and implementations are described in this application by illustration to some examples, those skilled in the art will understand that additional implementations and use cases may come about in many different arrangements and scenarios. Innovations described herein may be implemented across many differing platform types, devices, systems, shapes, sizes, packaging arrangements. For example, implementations or uses may come about via integrated chip implementations or other non-module-component based devices (e.g., end-user devices, vehicles, communication devices, computing devices, industrial equipment, retail devices or purchasing devices, medical devices, AI-enabled devices, etc.). While some examples may or may not be specifically directed to use cases or applications, a wide assortment of applicability of described innovations may occur.

Implementations may range from chip-level or modular components to non-modular, non-chip-level implementations and further to aggregated, distributed, or original equipment manufacturer (OEM) devices or systems incorporating one or more described aspects. In some practical settings, devices incorporating described aspects and features may also necessarily include additional components and features for implementation and practice of claimed and described aspects. It is intended that innovations described herein may be practiced in a wide variety of implementations, including both large devices or small devices, chip-level components, multi-component systems (e.g., radio frequency (RF)-chain, communication interface, processor), distributed arrangements, end-user devices, etc. of varying sizes, shapes, and constitution.

In the following description, numerous specific details are set forth, such as examples of specific components, circuits, and processes to provide a thorough understanding of the present disclosure. The term "coupled" as used herein means connected directly to or connected through one or more intervening components or circuits. Also, in the following description and for purposes of explanation, specific nomenclature is set forth to provide a thorough understanding of the present disclosure. However, it will be apparent to one skilled in the art that these specific details may not be required to practice the teachings disclosed herein. In other instances, well known circuits and devices are shown in block diagram form to avoid obscuring teachings of the present disclosure.

Some portions of the detailed descriptions which follow are presented in terms of procedures, logic blocks, processing, and other symbolic representations of operations on data bits within a computer memory. In the present disclosure, a procedure, logic block, process, or the like, is conceived to be a self-consistent sequence of steps or instructions leading to a desired result. The steps are those requiring physical manipulations of physical quantities. Usually, although not necessarily, these quantities take the form of electrical or magnetic signals capable of being stored, transferred, combined, compared, and otherwise manipulated in a computer system.

In the figures, a single block may be described as performing a function or functions. The function or functions performed by that block may be performed in a single component or across multiple components, and/or may be performed using hardware, software, or a combination of hardware and software. To clearly illustrate this interchangeability of hardware and software, various illustrative components, blocks, modules, circuits, and steps are described below generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Also, the example devices may include components other than those shown, including well-known components such as a processor, memory, and the like.

Unless specifically stated otherwise as apparent from the following discussions, it is appreciated that throughout the present application, discussions utilizing the terms such as "accessing," "receiving," "sending," "using," "selecting," "determining," "normalizing," "multiplying," "averaging," "monitoring," "comparing," "applying," "updating," "measuring," "deriving," "settling," "generating" or the like, refer to the actions and processes of a computer system, or similar electronic computing device, that manipulates and transforms data represented as physical (electronic) quantities within the computer system's registers and memories into other data similarly represented as physical quantities within the computer system's registers, memories, or other such information storage, transmission, or display devices.

The terms "device" and "apparatus" are not limited to one or a specific number of physical objects (such as one smartphone, one camera controller, one processing system, and so on). As used herein, a device may be any electronic device with one or more parts that may implement at least some portions of the disclosure. While the below description and examples use the term "device" to describe various aspects of the disclosure, the term "device" is not limited to a specific configuration, type, or number of objects. As used herein, an apparatus may include a device or a portion of the device for performing the described operations.

As used herein, including in the claims, the term "or," when used in a list of two or more items, means that any one of the listed items may be employed by itself, or any combination of two or more of the listed items may be employed. For example, if a composition is described as containing components A, B, or C, the composition may contain A alone; B alone; C alone; A and B in combination; A and C in combination; B and C in combination; or A, B, and C in combination.

Also, as used herein, including in the claims, "or" as used in a list of items prefaced by "at least one of" indicates a disjunctive list such that, for example, a list of "at least one of A, B, or C" means A or B or C or AB or AC or BC or ABC (that is A and B and C) or any of these in any combination thereof.

Also, as used herein, the term "substantially" is defined as largely but not necessarily wholly what is specified (and includes what is specified; for example, substantially 90 degrees includes 90 degrees and substantially parallel includes parallel), as understood by a person of ordinary skill in the art. In any disclosed implementations, the term "substantially" may be substituted with "within [a percentage] of" what is specified, where the percentage includes. 1, 1, 5, or 10 percent.

Also, as used herein, relative terms, unless otherwise specified, may be understood to be relative to a reference by a certain amount. For example, terms such as "higher" or "lower" or "more" or "less" may be understood as higher, lower, more, or less than a reference value by a threshold amount.

BRIEF DESCRIPTION OF THE DRAWINGS

A further understanding of the nature and advantages of the present disclosure may be realized by reference to the following drawings. In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

FIG. 5 is an example mapping between a primary chiplet and a secondary chiplet according to one or more aspects of the disclosure.

FIG. 14 is a flow chart illustrating an example method for a state transition to a partial sleep state for a main domain and a separate domain according to one or more aspects of the disclosure.

Like reference numbers and designations in the various drawings indicate like elements.

DETAILED DESCRIPTION

Figure 1:
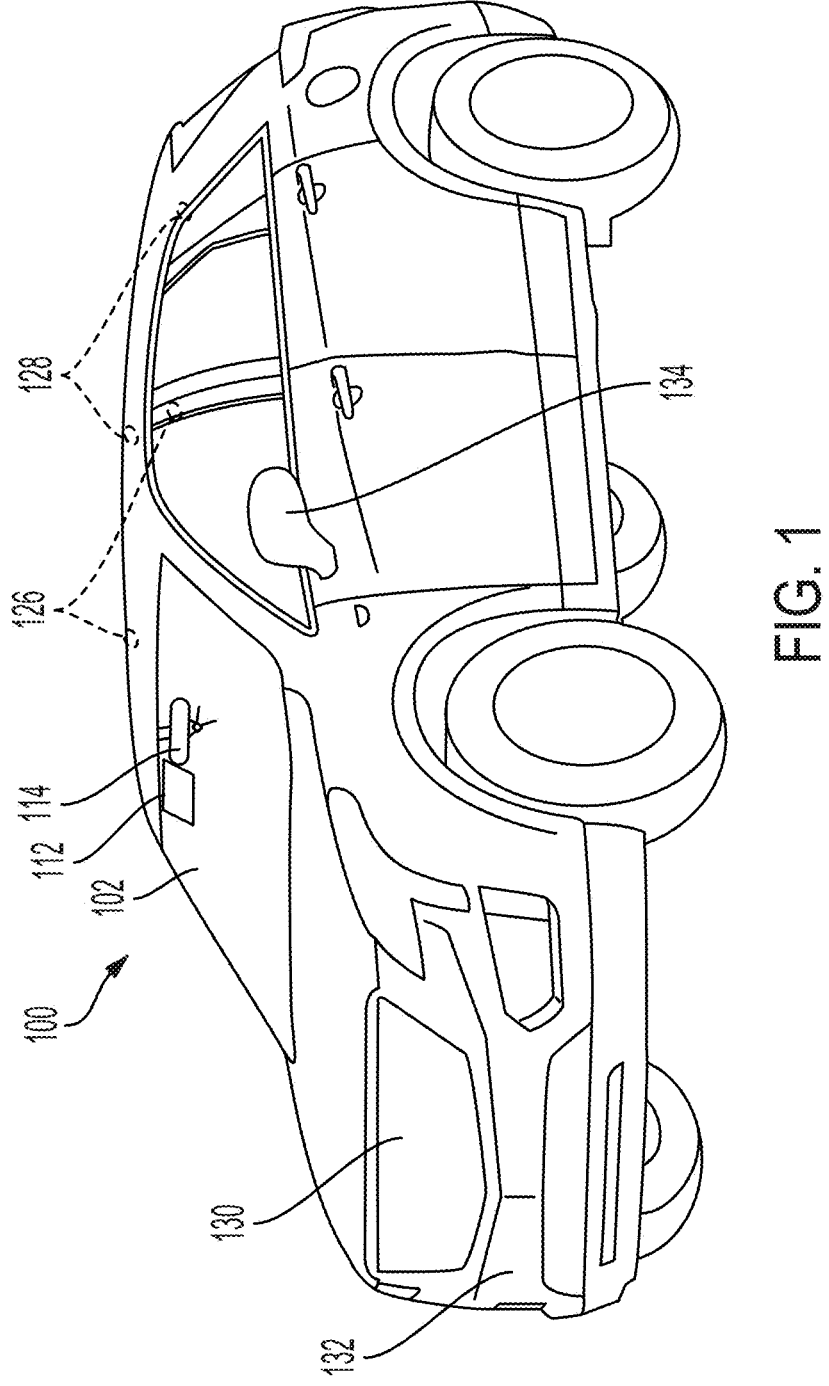
FIG. 1 is a perspective view of a motor vehicle with a power state management system according to embodiments of this disclosure.

The detailed description set forth below, in connection with the appended drawings, is intended as a description of various configurations and is not intended to limit the scope of the disclosure. Rather, the detailed description includes specific details for the purpose of providing a thorough understanding of the inventive subject matter. It will be apparent to those skilled in the art that these specific details are not required in every case and that, in some instances, well-known structures and components are shown in block diagram form for clarity of presentation.

Rapidly developed smart vehicle and portable electronic device technologies uses batteries. However, conventional technologies do not have separate power states corresponding to multiple domains in a single chiplet. Thus, in a resource-constrained environment such as smart vehicles and portable electronic devices, improved power state management to reduce power consumption and prolong the time to use the vehicles and devices is in need. In addition, when a processor includes multiple chiplets, the power state transition of each chiplet is not directly scalable. Due to multiple domains including multiple subsystems, multiple separate domains, the number of possible states and transitions exponentially increase with additional chiplets. Also, existing power states in the single chiplet are not applicable to multiple chiplets. In automotive applications, functionally safe power states and transitions are desirable to avoid any accidents related to malfunctional power state transitions. Thus, a coordinated and controlled entry into a low power state (e.g., the sleep state) is in need.

Shortcomings mentioned here are only representative and are included to highlight problems that the inventors have identified with respect to existing devices and sought to improve upon. Aspects of devices described below may address some or all of the shortcomings as well as others known in the art. Aspects of the improved devices described herein may present other benefits than, and be used in other applications than, those described above.

In some aspects, a processor may include a main domain and a separate domain coupled through a different power supply path than the main domain. The processor may transition the multiple domains (i.e., the main domain and the separate domain) of a chiplet to different power states. For example, when the processor receives an indication to enter a partial state (e.g., a shallow sleep state), the processor may isolate the separate domain from the main domain and transition the main domain into the sleep state while the separate domain remains in the active state for receiving processing requests or monitoring the main domain. Although the main domain is in the sleep state or a low power state, the separate domain may independently monitor the main domain or process processing requests.

In further aspects, the processor may include a primary chiplet and a secondary chiplet. The primary chiplet may operate as a master, and power states of the secondary chiplet may be determined in correspondence to the power states of the primary chiplet. For example, when the primary chiplet is in the partial sleep state (i.e., the main domain is in the sleep state while the separate domain is in the active state or the sleep state), the main domain of the secondary chiplet may be in the sleep sate and the separate domain of the secondary chiplet may be in the off state.

Particular implementations of the subject matter described in this disclosure may be implemented to realize one or more of the following potential advantages or benefits. In some aspects, the present disclosure provides techniques for improved power state transition that may be particularly beneficial in smart vehicle and other applications. For example, the processor for a smart vehicle may consume less energy in the battery and at the same time keep maintaining the health of the processor due to the separate domain with the active state. Also, the active separate domain may respond to or report issues in the main domain in real time or near real time to the user or a system without using a cold boot or quick boot. In addition, the power states of multiple chiplets are efficiently managed and determined in real time or near real time because valid power states of the secondary chiplet is in correspondence to the primary chiplet.

FIG. 1 is a perspective view of a motor vehicle with a driver monitoring system according to embodiments of this disclosure. A vehicle 100 may include a front-facing camera 112 mounted inside the cabin looking through the windshield 102. The vehicle may also include a cabin-facing camera 114 mounted inside the cabin looking towards occupants of the vehicle 100, and in particular the driver of the vehicle 100. Although one set of mounting positions for cameras 112 and 114 are shown for vehicle 100, other mounting locations may be used for the cameras 112 and 114. For example, one or more cameras may be mounted on one of the driver or passenger B pillars 126 or one of the driver or passenger C pillars 128, such as near the top of the pillars 126 or 128. As another example, one or more cameras may be mounted at the front of vehicle 100, such as behind the radiator grill 130 or integrated with bumper 132. As a further example, one or more cameras may be mounted as part of a driver or passenger side mirror assembly 134.

The camera 112 may be oriented such that the field of view of camera 112 captures a scene in front of the vehicle 100 in the direction that the vehicle 100 is moving when in drive mode or forward direction. In some embodiments, an additional camera may be located at the rear of the vehicle 100 and oriented such that the field of view of the additional camera captures a scene behind the vehicle 100 in the direction that the vehicle 100 is moving when in reverse direction. Although embodiments of the disclosure may be described with reference to a "front-facing" camera, referring to camera 112, aspects of the disclosure may be applied similarly to a "rear-facing" camera facing in the reverse direction of the vehicle 100. Thus, the benefits obtained while the operator is driving the vehicle 100 in a forward direction may likewise be obtained while the operator is driving the vehicle 100 in a reverse direction.

Further, although embodiments of the disclosure may be described with reference a "front-facing" camera, referring to camera 112, aspects of the disclosure may be applied similarly to an input received from an array of cameras mounted around the vehicle 100 to provide a larger field of view, which may be as large as 360 degrees around parallel to the ground and/or as large as 360 degrees around a vertical direction perpendicular to the ground. For example, additional cameras may be mounted around the outside of vehicle 100, such as on or integrated in the doors, on or integrated in the wheels, on or integrated in the bumpers, on or integrated in the hood, and/or on or integrated in the roof.

The camera 114 may be oriented such that the field of view of camera 114 captures a scene in the cabin of the vehicle and includes the user operator of the vehicle, and in particular the face of the user operator of the vehicle with sufficient detail to discern a gaze direction of the user operator.

Each of the cameras 112 and 114 may include one, two, or more image sensors, such as including a first image sensor. When multiple image sensors are present, the first image sensor may have a larger field of view (FOV) than the second image sensor or the first image sensor may have different sensitivity or different dynamic range than the second image sensor. In one example, the first image sensor may be a wide-angle image sensor, and the second image sensor may be a telephoto image sensor. In another example, the first sensor is configured to obtain an image through a first lens with a first optical axis and the second sensor is configured to obtain an image through a second lens with a second optical axis different from the first optical axis. Additionally or alternatively, the first lens may have a first magnification, and the second lens may have a second magnification different from the first magnification. This configuration may occur in a camera module with a lens cluster, in which the multiple image sensors and associated lenses are located in offset locations within the camera module. Additional image sensors may be included with larger, smaller, or same fields of view.

Each image sensor may include means for capturing data representative of a scene, such as image sensors (including charge-coupled devices (CCDs), Bayer-filter sensors, infrared (IR) detectors, ultraviolet (UV) detectors, complimentary metal-oxide-semiconductor (CMOS) sensors), and/or time of flight detectors. The apparatus may further include one or more means for accumulating and/or focusing light rays into the one or more image sensors (including simple lenses, compound lenses, spherical lenses, and non-spherical lenses). These components may be controlled to capture the first, second, and/or more image frames. The image frames may be processed to form a single output image frame, such as through a fusion operation, and that output image frame further processed according to the aspects described herein.

As used herein, image sensor may refer to the image sensor itself and any certain other components coupled to the image sensor used to generate an image frame for processing by the image signal processor or other logic circuitry or storage in memory, whether a short-term buffer or longer-term non-volatile memory. For example, an image sensor may include other components of a camera, including a shutter, buffer, or other readout circuitry for accessing individual pixels of an image sensor. The image sensor may further refer to an analog front end or other circuitry for converting analog signals to digital representations for the image frame that are provided to digital circuitry coupled to the image sensor.

Figure 2:
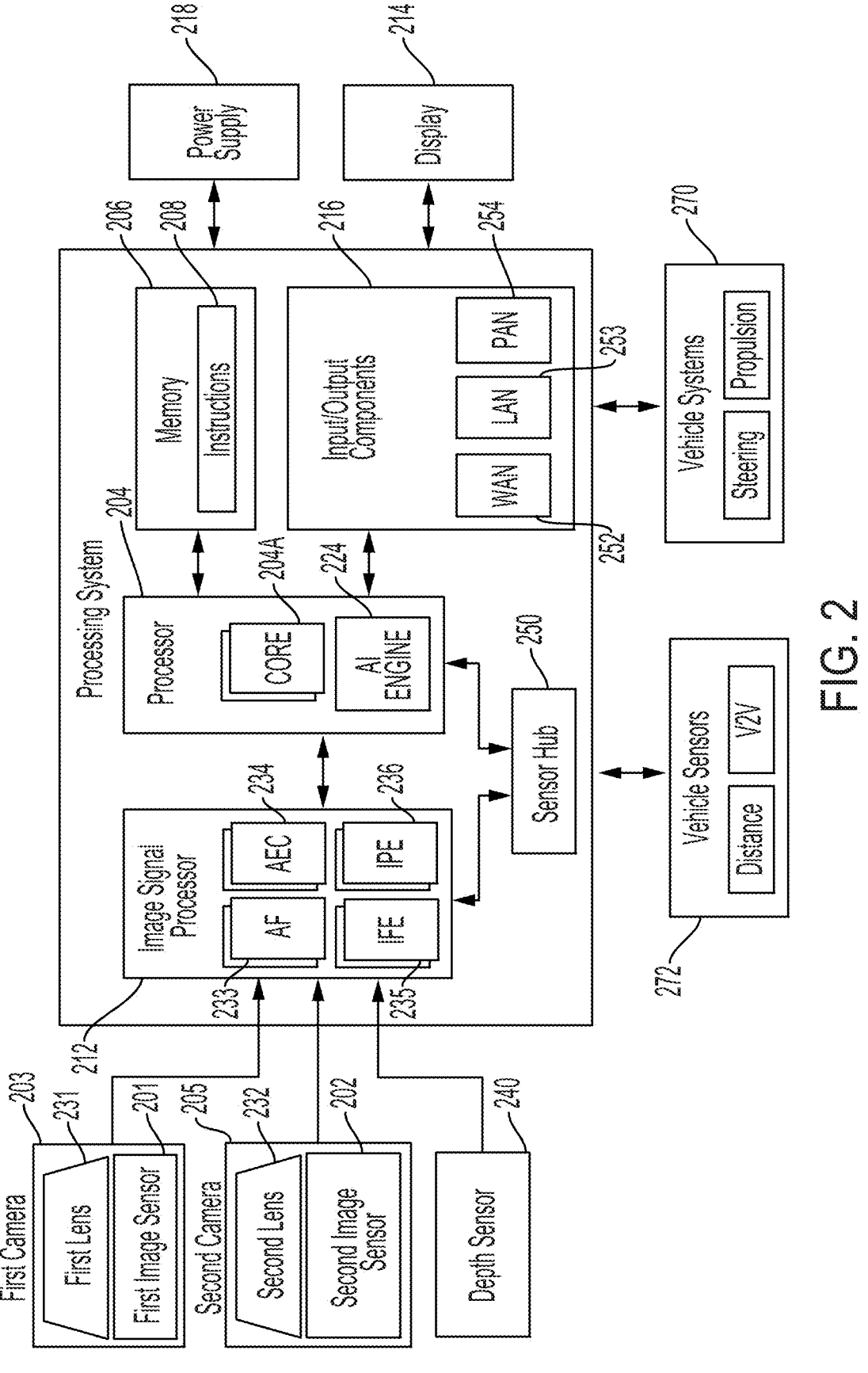
FIG. 2 shows a block diagram of an example power state management system for a vehicle according to one or more aspects of the disclosure.

FIG. 2 shows a block diagram of an example power state management system for a vehicle according to one or more aspects of the disclosure. The vehicle 100 may include, or otherwise be coupled to, an image signal processor 212 for processing image frames from one or more image sensors, such as a first image sensor 201, a second image sensor 202, and a depth sensor 240. In some implementations, the vehicle 100 also includes or is coupled to a processor (e.g., CPU) 204 and a memory 206 storing instructions 208. The vehicle 100 may also include or be coupled to a display 214 and input/output (I/O) components 216. I/O components 216 may be used for interacting with a user, such as a touch screen interface and/or physical buttons. I/O components 216 may also include network interfaces for communicating with other devices, such as other vehicles, an operator's mobile devices, and/or a remote monitoring system. The network interfaces may include one or more of a wide area network (WAN) adaptor 252, a local area network (LAN) adaptor 253, and/or a personal area network (PAN) adaptor 254. An example WAN adaptor 252 is a 4G LTE or a 5G NR wireless network adaptor. An example LAN adaptor 253 is an IEEE 802.11 WiFi wireless network adapter. An example PAN adaptor 254 is a Bluetooth wireless network adaptor. Each of the adaptors 252, 253, and/or 254 may be coupled to an antenna, including multiple antennas configured for primary and diversity reception and/or configured for receiving specific frequency bands. The vehicle 100 may further include or be coupled to a power supply 218, such as a battery or an alternator. The vehicle 100 may also include or be coupled to additional features or components that are not shown in FIG. 2. In one example, a wireless interface, which may include one or more transceivers and associated base-band processors, may be coupled to or included in WAN adaptor 252 for a wireless communication device. In a further example, an analog front end (AFE) to convert analog image frame data to digital image frame data may be coupled between the image sensors 201 and 202 and the image signal processor 212.

The vehicle 100 may include a sensor hub 250 for interfacing with sensors to receive data regarding movement of the vehicle 100, data regarding an environment around the vehicle 100, and/or other non-camera sensor data. One example non-camera sensor is a gyroscope, a device con-figured for measuring rotation, orientation, and/or angular velocity to generate motion data. Another example non-camera sensor is an accelerometer, a device configured for measuring acceleration, which may also be used to deter-mine velocity and distance traveled by appropriately inte-grating the measured acceleration, and one or more of the acceleration, velocity, and or distance may be included in generated motion data. In further examples, a non-camera sensor may be a global positioning system (GPS) receiver, a light detection and ranging (LiDAR) system, a radio detection and ranging (RADAR) system, or other ranging systems. For example, the sensor hub 250 may interface to a vehicle bus for sending configuration commands and/or receiving information from vehicle sensors 272, such as distance (e.g., ranging) sensors or vehicle-to-vehicle (V2V) sensors (e.g., sensors for receiving information from nearby vehicles).

The image signal processor (ISP) 212 may receive image data, such as used to form image frames. In one embodi-ment, a local bus connection couples the image signal processor 212 to image sensors 201 and 202 of a first camera 203, which may correspond to camera 112 of FIG. 1, and second camera 205, which may correspond to camera 114 of FIG. 1, respectively. In another embodiment, a wire inter-face may couple the image signal processor 212 to an external image sensor. In a further embodiment, a wireless interface may couple the image signal processor 212 to the image sensor 201, 202.

The first camera 203 may include the first image sensor 201 and a corresponding first lens 231. The second camera 205 may include the second image sensor 202 and a corre-sponding second lens 232. Each of the lenses 231 and 232 may be controlled by an associated autofocus (AF) algo-rithm 233 executing in the ISP 212, which adjust the lenses 231 and 232 to focus on a particular focal plane at a certain scene depth from the image sensors 201 and 202. The AF algorithm 233 may be assisted by depth sensor 240. In some embodiments, the lenses 231 and 232 may have a fixed focus.

The first image sensor 201 and the second image sensor 202 are configured to capture one or more image frames. Lenses 231 and 232 focus light at the image sensors 201 and 202, respectively, through one or more apertures for receiv-ing light, one or more shutters for blocking light when outside an exposure window, one or more color filter arrays (CFAs) for filtering light outside of specific frequency ranges, one or more analog front ends for converting analog measurements to digital information, and/or other suitable components for imaging.

In some embodiments, the image signal processor 212 may execute instructions from a memory, such as instruc-tions 208 from the memory 206, instructions stored in a separate memory coupled to or included in the image signal processor 212, or instructions provided by the processor 204. In addition, or in the alternative, the image signal processor 212 may include specific hardware (such as one or more integrated circuits (ICs)) configured to perform one or more operations described in the present disclosure. For example, the image signal processor 212 may include one or more image front ends (IFEs) 235, one or more image post-processing engines (IPEs) 236, and or one or more auto exposure compensation (AEC) 234 engines. The AF 233, AEC 234, IFE 235, IPE 236 may each include application-specific circuitry, be embodied as software code executed by the ISP 212, and/or a combination of hardware within and software code executing on the ISP 212.

In some implementations, the memory 206 may include a non-transient or non-transitory computer readable medium storing computer-executable instructions 208 to perform all or a portion of one or more operations described in this disclosure. In some implementations, the instructions 208 include a camera application (or other suitable application) to be executed during operation of the vehicle 100 for generating images or videos. The instructions 208 may also include other applications or programs executed for the vehicle 100, such as an operating system, mapping applica-tions, or entertainment applications. Execution of the camera application, such as by the processor 204, may cause the vehicle 100 to generate images using the image sensors 201 and 202 and the image signal processor 212. The memory 206 may also be accessed by the image signal processor 212 to store processed frames or may be accessed by the pro-cessor 204 to obtain the processed frames. In some embodi-ments, the vehicle 100 includes a system on chip (SoC) that incorporates the image signal processor 212, the processor 204, the sensor hub 250, the memory 206, and input/output components 216 into a single package.

In some embodiments, at least one of the image signal processor 212 or the processor 204 executes instructions to perform various operations described herein, including object detection, risk map generation, driver monitoring, and driver alert operations. For example, execution of the instructions can instruct the image signal processor 212 to begin or end capturing an image frame or a sequence of image frames. In some embodiments, the processor 204 may include one or more general-purpose processor cores 204A capable of executing scripts or instructions of one or more software programs, such as instructions 208 stored within the memory 206. For example, the processor 204 may include one or more application processors configured to execute the camera application (or other suitable application for generating images or video) stored in the memory 206.

In executing the camera application, the processor 204 may be configured to instruct the image signal processor 212 to perform one or more operations with reference to the image sensors 201 or 202. For example, the camera appli-cation may receive a command to begin a video preview display upon which a video comprising a sequence of image frames is captured and processed from one or more image sensors 201 or 202 and displayed on an informational display on display 214 in the cabin of the vehicle 100.

In some embodiments, the processor 204 may include ICs or other hardware (e.g., an artificial intelligence (AI) engine 224) in addition to the ability to execute software to cause the vehicle 100 to perform a number of functions or opera-tions, such as the operations described herein. For example, the processor 204 may include a first main domain and a first separate domain to form a primary chiplet and is configured to manage power state of the first main domain and the separate domain. In some embodiments, the processor 204 may control a secondary chiplet with a second main domain and a second separate domain with respect to power states of the second main domain and the second separate domain. The processor 204 may enter a sleep state or a low power state when the vehicle does not receive any processing requests from the first camera 203, the second camera 205, the depth sensor 240, the sensor hub 250, or input/output components 216. In some examples, the processor 204 may enter different power states based on the states of components in the vehicle.

In some embodiments, the display 214 may include one or more suitable displays or screens allowing for user interaction and/or to present items to the user, such as a preview of the image frames being captured by the image sensors 201 and 202. In some embodiments, the display 214 is a touch-sensitive display. The I/O components 216 may be or include any suitable mechanism, interface, or device to receive input (such as commands) from the user and to provide output to the user through the display 214. For example, the I/O components 216 may include (but are not limited to) a graphical user interface (GUI), a keyboard, a mouse, a microphone, speakers, a squeezable bezel, one or more buttons (such as a power button), a slider, a switch, and so on. In some embodiments involving autonomous driving, the I/O components 216 may include an interface to a vehicle's bus for providing commands and information to and receiving information from vehicle systems 270 including propulsion (e.g., commands to increase or decrease speed or apply brakes) and steering systems (e.g., commands to turn wheels, change a route, or change a final destination).

While shown to be coupled to each other via the processor 204, components (such as the processor 204, the memory 206, the image signal processor 212, the display 214, and the I/O components 216) may be coupled to each another in other various arrangements, such as via one or more local buses, which are not shown for simplicity. While the image signal processor 212 is illustrated as separate from the processor 204, the image signal processor 212 may be a core of a processor 204 that is an application processor unit (APU), included in a system on chip (SoC), or otherwise included with the processor 204 for the power management. While the vehicle 100 is referred to in the examples herein for including aspects of the present disclosure, some device components may not be shown in FIG. 2 to prevent obscuring aspects of the present disclosure. Additionally, other components, numbers of components, or combinations of components may be included in a suitable vehicle for performing aspects of the present disclosure. As such, the present disclosure is not limited to a specific device or configuration of components, including the vehicle 100.

Figure 3:
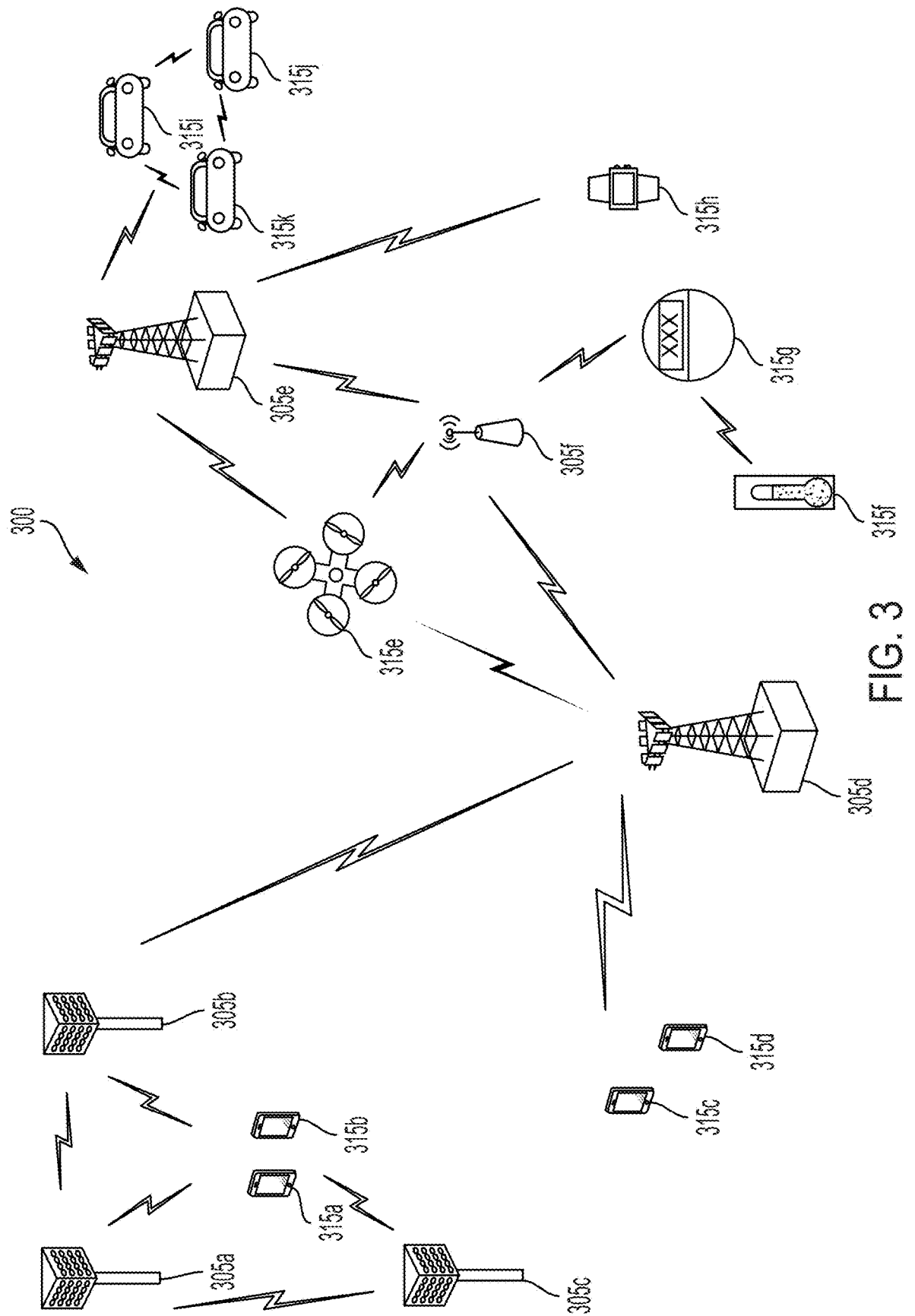
FIG. 3 is a block diagram illustrating details of an example wireless communication system according to one or more aspects.

The vehicle 100 may communicate as a user equipment (UE) within a wireless network 300, such as through WAN adaptor 252, as shown in FIG. 3. FIG. 3 is a block diagram illustrating details of an example wireless communication system according to one or more aspects. Wireless network 300 may, for example, include a 5G wireless network. As appreciated by those skilled in the art, components appearing in FIG. 3 are likely to have related counterparts in other network arrangements including, for example, cellular-style network arrangements and non-cellular-style-network arrangements (e.g., device-to-device or peer-to-peer or ad-hoc network arrangements, etc.).

Wireless network 300 illustrated in FIG. 3 includes base stations 305 and other network entities. A base station may be a station that communicates with the UEs and may also be referred to as an evolved node B (eNB), a next generation eNB (gNB), an access point, and the like. Each base station 305 may provide communication coverage for a particular geographic area. In 3GPP, the term "cell" may refer to this particular geographic coverage area of a base station or a base station subsystem serving the coverage area, depending on the context in which the term is used. In implementations of wireless network 300 herein, base stations 305 may be associated with a same operator or different operators (e.g., wireless network 300 may include a plurality of operator wireless networks). Additionally, in implementations of wireless network 300 herein, base station 305 may provide wireless communications using one or more of the same frequencies (e.g., one or more frequency bands in licensed spectrum, unlicensed spectrum, or a combination thereof) as a neighboring cell. In some examples, an individual base station 305 or UE 315 may be operated by more than one network operating entity. In some other examples, each base station 305 and UE 315 may be operated by a single network operating entity.

A base station may provide communication coverage for a macro cell or a small cell, such as a pico cell or a femto cell, or other types of cell. A macro cell generally covers a relatively large geographic area (e.g., several kilometers in radius) and may allow unrestricted access by UEs with service subscriptions with the network provider. A small cell, such as a pico cell, would generally cover a relatively smaller geographic area and may allow unrestricted access by UEs with service subscriptions with the network provider. A small cell, such as a femto cell, would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). A base station for a macro cell may be referred to as a macro base station. A base station for a small cell may be referred to as a small cell base station, a pico base station, a femto base station or a home base station. In the example shown in FIG. 3, base stations 305*d* and 305*e* are regular macro base stations, while base stations 305*a*-305*c* are macro base stations enabled with one of three-dimension (3D), full dimension (FD), or massive MIMO. Base stations 305*a*-305*c* take advantage of their higher dimension MIMO capabilities to exploit 3D beamforming in both elevation and azimuth beamforming to increase coverage and capacity. Base station 305*f* is a small cell base station which may be a home node or portable access point. A base station may support one or multiple (e.g., two, three, four, and the like) cells.

Wireless network 300 may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. In some scenarios, networks may be enabled or configured to handle dynamic switching between synchronous or asynchronous operations.

UEs 315 are dispersed throughout the wireless network 300, and each UE may be stationary or mobile. It should be appreciated that, although a mobile apparatus is commonly referred to as a UE in standards and specifications promulgated by the 3GPP, such apparatus may additionally or otherwise be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, a gaming device, an augmented reality device, vehicular component, vehicular device, or vehicular module, or some other suitable terminology.

Some non-limiting examples of a mobile apparatus, such as may include implementations of one or more of UEs 315, include a mobile, a cellular (cell) phone, a smart phone, a session initiation protocol (SIP) phone, a wireless local loop (WLL) station, a laptop, a personal computer (PC), a notebook, a netbook, a smart book, a tablet, a personal digital assistant (PDA), and a vehicle. Although UEs 315a-j are specifically shown as vehicles, a vehicle may employ the communication configuration described with reference to any of the UEs 315a-315k.

In one aspect, a UE may be a device that includes a Universal Integrated Circuit Card (UICC). In another aspect, a UE may be a device that does not include a UICC. In some aspects, UEs that do not include UICCs may also be referred to as IoE devices. UEs 315a-315d of the implementation illustrated in FIG. 3 are examples of mobile smart phone-type devices accessing wireless network 300. A UE may also be a machine specifically configured for connected communication, including machine type communication (MTC), enhanced MTC (eMTC), narrowband IoT (NB-IoT) and the like. UEs 315e-315k illustrated in FIG. 3 are examples of various machines configured for communication that access wireless network 300.

A mobile apparatus, such as UEs 315, may be able to communicate with any type of the base stations, whether macro base stations, pico base stations, femto base stations, relays, and the like. In FIG. 3, a communication link (represented as a lightning bolt) indicates wireless transmissions between a UE and a serving base station, which is a base station designated to serve the UE on the downlink or uplink, or desired transmission between base stations, and backhaul transmissions between base stations. UEs may operate as base stations or other network nodes in some scenarios. Backhaul communication between base stations of wireless network 300 may occur using wired or wireless communication links.

In operation at wireless network 300, base stations 305a-305c serve UEs 315a and 315b using 3D beamforming and coordinated spatial techniques, such as coordinated multipoint (CoMP) or multi-connectivity. Macro base station 305d performs backhaul communications with base stations 305a-305c, as well as small cell, base station 305f. Macro base station 305d also transmits multicast services which are subscribed to and received by UEs 315c and 315d. Such multicast services may include mobile television or stream video, or may include other services for providing community information, such as weather emergencies or alerts, such as Amber alerts or gray alerts.

Wireless network 300 of implementations supports mission critical communications with ultra-reliable and redundant links for mission critical devices, such UE 315e, which is a drone. Redundant communication links with UE 315e include from macro base stations 305d and 305e, as well as small cell base station 305f. Other machine type devices, such as UE 315f (thermometer), UE 315g (smart meter), and UE 315h (wearable device) may communicate through wireless network 300 either directly with base stations, such as small cell base station 305f, and macro base station 305e, or in multi-hop configurations by communicating with another user device which relays its information to the network, such as UE 315f communicating temperature measurement information to the smart meter, UE 315g, which is then reported to the network through small cell base station 305f. Wireless network 300 may also provide additional network efficiency through dynamic, low-latency TDD communications or low-latency FDD communications, such as in a vehicle-to-vehicle (V2V) mesh network between UEs 315i-315k communicating with macro base station 305e.

In some embodiments, UE 315 (e.g., the processor 204 in FIG. 2) may manage power states based on a signal through wireless network 300. For example, UE 315 may enter a sleep state or a low power state when UE 315 receives an indication to enter the sleep state or does not receive a signal through wireless network 300 for a predetermined period of time.

Figure 4:
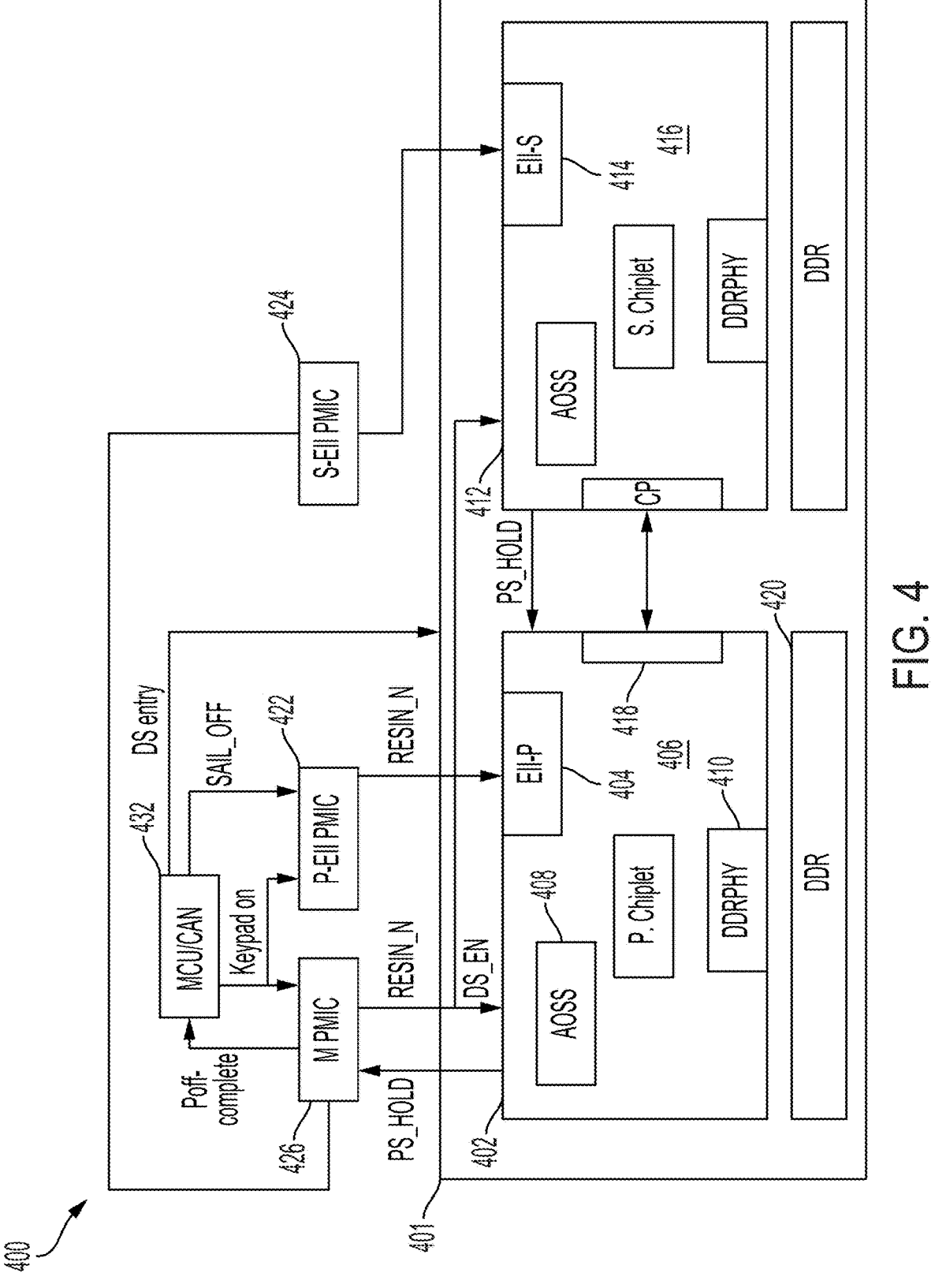
FIG. 4 is a block diagram illustrating an example chiplet architecture with multiple chiplets for a power management system according to one or more aspects of the disclosure.

FIG. 4 is a block diagram illustrating an example chiplet architecture with multiple chiplets for a power management system 400 according to one or more aspects of the disclosure. The multiple chiplets 402, 412 may be contained in the vehicle 100 in FIG. 1, the processor 204 in FIG. 2, and UE 315 in FIG. 3. FIG. 4 shows a processor 401 including two chiplets to illustrate communications among the two chiplets and external entities for power management. In other examples, the number of chiplets in the processor 401 may be a single chiplet, three chiplets, five chiplets, or any other suitable number of chiplets.

A power management system 400 may include a processor 401 that includes one or more chiplets 402, 412 for a system of chip (SoC). A chiplet may include an integrated circuit that contains subsystems (e.g., a main domain and a separate domain) to process processing requests. The chiplet may correspond to a die that is a small block of semiconducting material on which a given functional circuit is fabricated. In some examples, the SoC may have more than one chiplets (e.g., a primary chiplet 402 and a secondary chiplet 412) to process processing requests.

In some examples, each chiplet 402, 412 may include a separate domain 404, 414 and a main domain 406, 416. The separate domain 404, 414 (e.g., an electrically-independent domain (EII) or a safety island domain (SAIL)) coupled through a different power supply path (e.g., from a different power management integrated chip (PMIC)) than the main domain may monitor the safety of the main domain. To independently monitor the main domain, the separate domain 404, 414 may receive a power source that is electrically isolated from another power source to the main domain 406. For example, the separate domain 404, 414 may receive a first power source from a separate domain PMIC 422, 424 while the main domain 406, 416 may receive a second power source from a different PMIC 426 than the separate domain PMIC 422, 424. In some examples, all subsystems in the separate domain 404, 414 may use the separate domain power source. The separate domain 404, 414 may monitor the status or health of the main domain. For example, when a fault occurs in the main domain, the separate domain 414, 414 detects the fault and report to an external microcontroller unit (MCU) 432 to return an automotive platform to a safe state. The separate domain 404, 414 may, for example, improve reliability and safety in automotive systems. Thus, when the processor 401 including the chiplet 402, 412 is in a false state or crashed state, the separate domain 404, 414 may be able to operate independently (e.g., to perform an automotive function and/or monitor the status of the main domain 406, 416) and still maintain the communication with a component (e.g., a microcontroller unit (MCU) 432) that is external to the chiplet 402, 412 or the processor 401.

The main domain 406, 416 may perform processing requests. The main domain 406, 416 may use the main domain power source from the main domain PMIC 426. In some examples, each main domain 406, 416 in the one or more chiplets 402, 412 may be electrically coupled to one main domain PMIC 426 or corresponding main domain PMICs 426. In further examples, all subsystems other than the separate domain 414, 414 in the chiplet 402, 412 may form the main domain 406, 416. In some examples, the main domain 406, 416 may include an always-on-subsystem (AOSS) 408 to support an award-based architecture. In the award-based architecture, multiple subsystems in the chiplet 402, 412 may vote for different resources (e.g., a memory (MX) rail, a core logic (CX) rail of the chiplet 402, 412). Then, the AOSS 408 may aggregate the votes for the resources and interact with the PMIC 426 to increase or decrease the power. Also, the main domain 406, 416 may include a first interface 410 to be coupled to a memory 420. The memory 420 may be a short-term memory (e.g., a double data rate (DDR) synchronous dynamic random-access memory (SDRAM), DDR2, DDR3, DDR4, DDR5, and DDR6) to store data to be used by the chiplet 402, 412 to function. Also, the main domain 406 of a chiplet 402 may include a second interface 418 to communicate with another main domain 416.

The power management system 400 may further include multiple PMICs 422, 424, 426, which are external to the processor 401. A PMIC 422, 424, 426 may supply power to different subsystems and different areas of a chiplet 402, 412. For example, each separate domain 404, 414 may be coupled to a separate domain PMIC 422, 424. In some examples, all main domains 406, 416 in the one or more chiplets may be electrically coupled to one main domain PMIC 426 or corresponding main domain PMICs 425.

The power management system 400 may further include the MCU 432, which is external to the processor 401. For example, the MCU 432 may transmit commands (e.g., a request to enter the sleep state) to the processor 401, transmit commands (e.g., a request to power off the main or separate domain to the main or separate domain PMIC, the indicate to the processor 401 the power state for the processor 401, receive the power state from the processor 401, and/or check the health of the processor 401.

In some examples, the processor 401 may transition the separate domain 404 and/or the main domain 406 to a sleep state. For example, the sleep state may include a first sleep state and a second sleep state. The first sleep state may be referred to as a deep sleep state. The first sleep state may be a low power state for a domain (e.g., the separate domain 404 or the main domain 406 of the chiplet 402, 412), which maintains a lower power than the power of the second sleep state. The memory rails of subsystems in the respective domain in the first sleep state may be in a self-refresh mode and the rest (e.g., all subsystems and rails other than the memory rails) of the respective domain is an off state. In the self-refresh mode, the memory 420 may deactivate the clock to minimize power consumption but preserve data while operating at a retention or nominal voltage. Thus, in the first sleep mode of a domain, all logic, memory, and always-on (AON) domains may be in the off state and be collapsed without retention except that the memory is in the self-refresh mode to protect I/O contentions and to maintain data. In some examples, the domain in the first sleep state may be transitioned to an active state using a quick boot feature. The quick boot feature may enable the processor to meet the early audio, display, and camera standards in automotive applications. In some examples, the first sleep state in the automotive SoCs may be used in short term parking, a garage mode, or location-based feature enablement.

The second sleep state for a domain (e.g., the separate domain 404 or the main domain 406 of the chiplet 402, 412) may be in a low power state. But, in the second sleep state, the domain may retain data of subsystems and be ready to quickly transition to an active state. In some examples, when the main domain 406 of a chiplet 402 including the AOSS 408 is in the second sleep state, the separate domain 404 of the chiplet 402 may be in the second sleep state.

In further examples, the processor 401 may transition a domain (e.g., the separate domain 404 or the main domain 406 of the chiplet 402, 412) to an active state. In the active state, the respective domain may be operational such that the domain may receive an operational voltage and access to system resources. For example, the system resources may include a cache (e.g., a level 1 (L1) cache, a level 2 (L2) cache, a level 3 (L3) cache, and a last-level cache (LLC)), the memory 420, intellectual property (IP)-to-IP communication, and/or a reusable and functional block of logic or data for the domain. In some examples, during the active state of the domain, each subsystem of the domain may be in a different power state.

In further examples, the processor 401 may transition a domain (e.g., the separate domain 404 or the main domain 406 of the chiplet 402, 412) to an island state. In the island state, the respective domain may be in the second sleep state while one or more IP cores or reusable and functional blocks in the respective domain may be in the active state. Thus, in the island state, some subsystems of the respective domain may be in the second sleep state while the other subsystems of the respective domain may be in the active state.

In further examples, the processor 401 may transition a domain (e.g., the separate domain 404 or the main domain 406 of the chiplet 402, 412) to an off state. In the off state, the respective domain may not receive any power or current from the respective PMIC. In the off state, the domain may not retain or maintain a state or data of any subsystem in the domain. In some examples, a cold boot may be used to transition the domain from the off state to the active state.

In even further examples, the processor 401 may transition multiple domains to different power states. For example, the processor 401 may transition to a partial sleep state (e.g., a shallow sleep state). In the partial sleep state, the processor 401 may isolate the separate domain from the main domain and transition the main domain of a chiplet into the sleep state (e.g., the first sleep state) while the separate domain of the chiplet remains in the active state for receiving processing requests or monitoring the main domain. Although the main domain is in a low power state, the separate domain may independently monitor the main domain or process processing requests. Thus, the processor 401 may consume less energy and at the same time keep maintaining the health of the processor 401 due to the separate domain with the active state. Also, the active separate domain may respond to any issue in the main domain in real time or near real time without using a cold boot or quick boot. In some examples, when the separate domain is actively running, the separate domain may interface to the vehicle network directly instead of the MCU 432. Thus, regardless of functioning of the MCU 432, the separate domain may communicate with the vehicle network.

In further aspects, the processor 401 may include a primary chiplet and a secondary chiplet. In some examples, the primary chiplet and the secondary chiplet may have the same hardware. The secondary chiplet may be one or more secondary chiplets. The primary chiplet may operate as a master, and power states of the secondary chiplet may be determined in correspondence to the power states of the primary chiplet. For example, when the primary chiplet is in a partial sleep state (i.e., the main domain is in the sleep state (e.g., the first sleep state) while the separate domain is in the active state or the sleep state (e.g., the second sleep state)), the power states of the main domain and the separate domain in the secondary chiplet may be determined to transition to the sleep sate (e.g., the first sleep state) and the off state, respectively. Thus, the power states of multiple chiplets are efficiently managed and determined in real time or near real time because valid power states of the secondary chiplet is in correspondence to the primary chiplet.

FIG. 5 is an example mapping between a primary chiplet 402 and a secondary chiplet 412 according to one or more aspects of the disclosure. For example, when the primary chiplet 402 is in the active state, the secondary chiplet 412 may transition to the active state, the sleep state (e.g., the second sleep state), or the off state. When the primary chiplet 402 is in the island state, the secondary chiplet 412 may transition to the sleep state (e.g., the second sleep state). When the primary chiplet 402 is in the sleep state (e.g., the second sleep state), the secondary chiplet 412 may transition to the sleep state (e.g., the second sleep state). When the primary chiplet 402 is in the partial state (e.g., the main domain is the first sleep state and the separate domain is in the active or second sleep state), the secondary chiplet 412 may transition to the sleep state (e.g., the first sleep state). The sleep state of the secondary chiplet 412 may include that the main domain of the secondary chiplet 412 is in the sleep state (e.g., the first sleep state), and the separate domain of the secondary chiplet 412 is the off state. In further examples, the primary chiplet 402 may be in the sleep state (e.g., the first sleep state) that includes the main domain is the first sleep state and the separate domain is in the off state. Then, the secondary chiplet 412 may transition to the sleep state (e.g., the first sleep state) that includes that the main domain of the secondary chiplet 412 is in the sleep state (e.g., the first sleep state) and the separate domain of the secondary chiplet 412 is the active state, the second sleep state, or the off state. In further examples, the primary chiplet 402 may be in the safety-only state that includes the main domain is the off state and the separate domain is in the active state. Then, the secondary chiplet 412 may transition to the off state that includes that the main domain and the separate domain are in the off state. In further examples, the primary chiplet 402 may be in the off state that includes the main domain and the separate domain are in the off state. Then, the secondary chiplet 412 may transition to the off state that includes that the main domain and the separate domain are in the off state.

Figure 6:
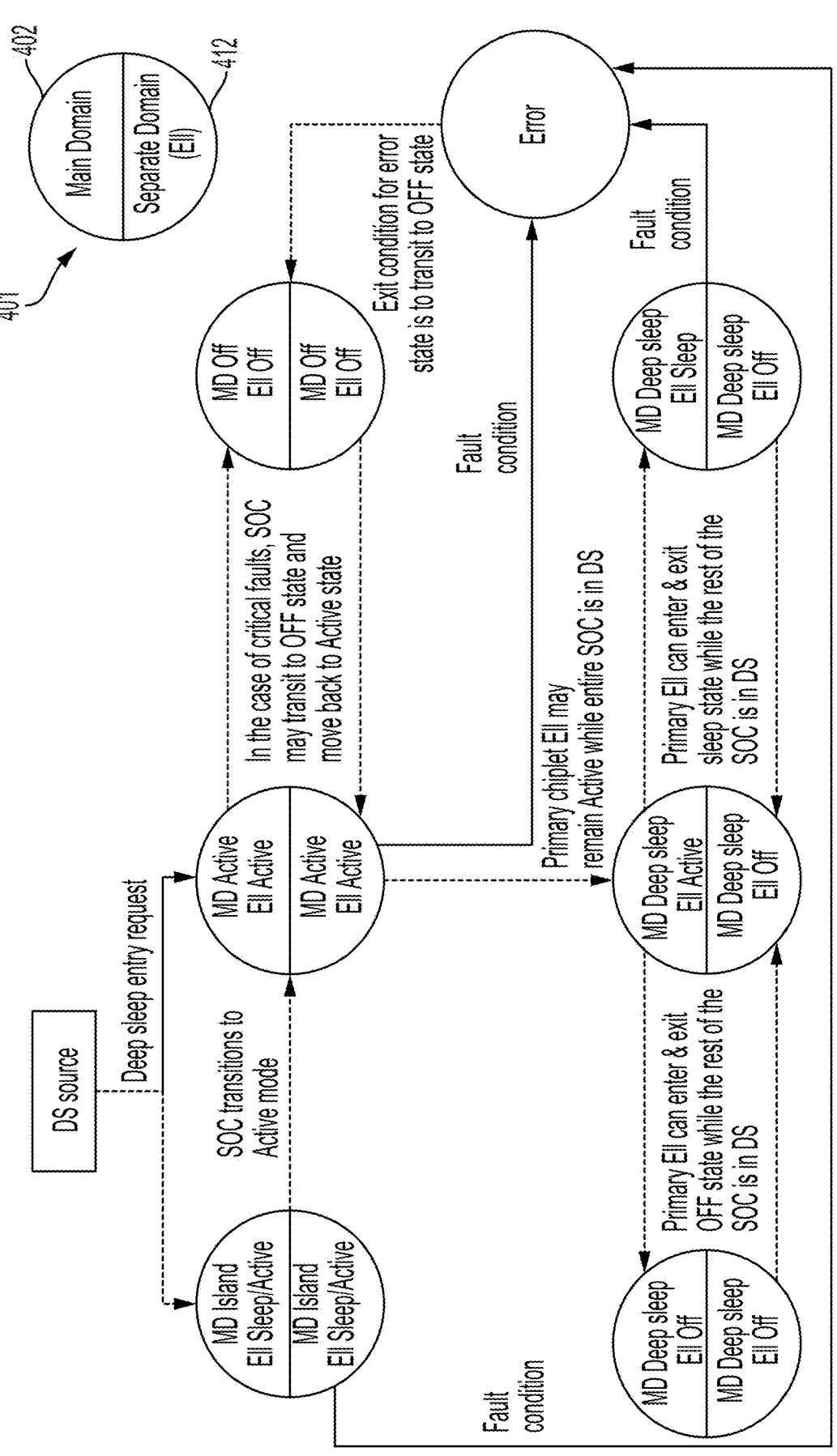
FIG. 6 is a multi-chiplet state transition flow diagram for sleep state entry according to one or more aspects of the disclosure.

FIG. 6 is a multi-chiplet state transition flow diagram for sleep state entry according to one or more aspects of the disclosure. The flow diagram shows multi-chiplet SoC state transitions when a sleep state entry request is triggered. For example, each block indicates the processor 401 in FIG. 4. The top of the block indicates the primary chiplet 402 including the power states of the main domain 406 and the separate domain 404 while the bottom of the block indicates the secondary chiplet 412 including the power states of the main domain 416 and the separate domain 414.

The processor 401 may receive an indication to enter the sleep state or the partial sleep state from the sleep state source (e.g., the MCU 432). In some examples, the indication to enter the sleep state may include an indication of a domain (e.g., the main domain and/or the separate domain) to enter a sleep state (e.g., the first sleep state) or a general indication to enter a sleep state (e.g., the first sleep state) in a processor level. The indication may be based on an automotive event trigger, such as the start of a short-term parking, the start of a garage mode, or a location-based feature enablement.

When the sleep state or the partial sleep state is triggered, the processor 401 may be in the active state or in the island state. In the active state, both primary and secondary chiplets may be in the active state or SoC. In the island state, the main domains of both primary and secondary chiplets are in the island state while the separate domains of both chiplets are in the sleep state (e.g., the second sleep state) or in the active state. When the processor 401 is in the island state, the processor 401 may transition to the active state. Then, the processor may transition the primary chiplet 402 to the partial sleep state (e.g., the main domain 406 is in the sleep state and the separate domain 404 is in the active state). The processor may also transition the secondary chiplet 412 to the sleep state (e.g., the main domain 406 is in the sleep state and the separate domain 404 is in the off state). Thus, the main domains of both the chiplets may be in the sleep state (e.g., the first sleep state) while the separate domains of the primary chiplet 402 and the secondary chiplet 412 may be in the active state and in the off state, respectively. Even if the separate domain of the secondary chiplet 412 is in the off state or in the first sleep state, the separate domain of the primary chiplet 402 may be in the active state. After entering the sleep state, the processor may further transition the separate domain of the primary chiplet 402 to the sleep state (e.g., the first or second sleep state) or the off state when no workload of the separate domain exists for a prolonged duration. But, if there is an active workload, the processor may maintain the active state of the separate domain. In some examples, the workload may include receiving a scanned message, an Ethernet message from the vehicle network or the MCU to monitor continuously, a periodic task to work on, or any other suitable processing requests.

In further examples, when both chiplets are in active state, critical faults that prevent from entering the sleep state may exist. In such examples, the processor 401 may transition to an error state. To exit the error state, the processor may transition to the off state. In other examples, when the critical faults are detected, the processor 401 may transition both chiplets into the off state. Then, the processor may transition from the off state back to the active state. To exit the off state of both chiplets, the processor 401 may reboot the system or both chiplets.

Figure 7:
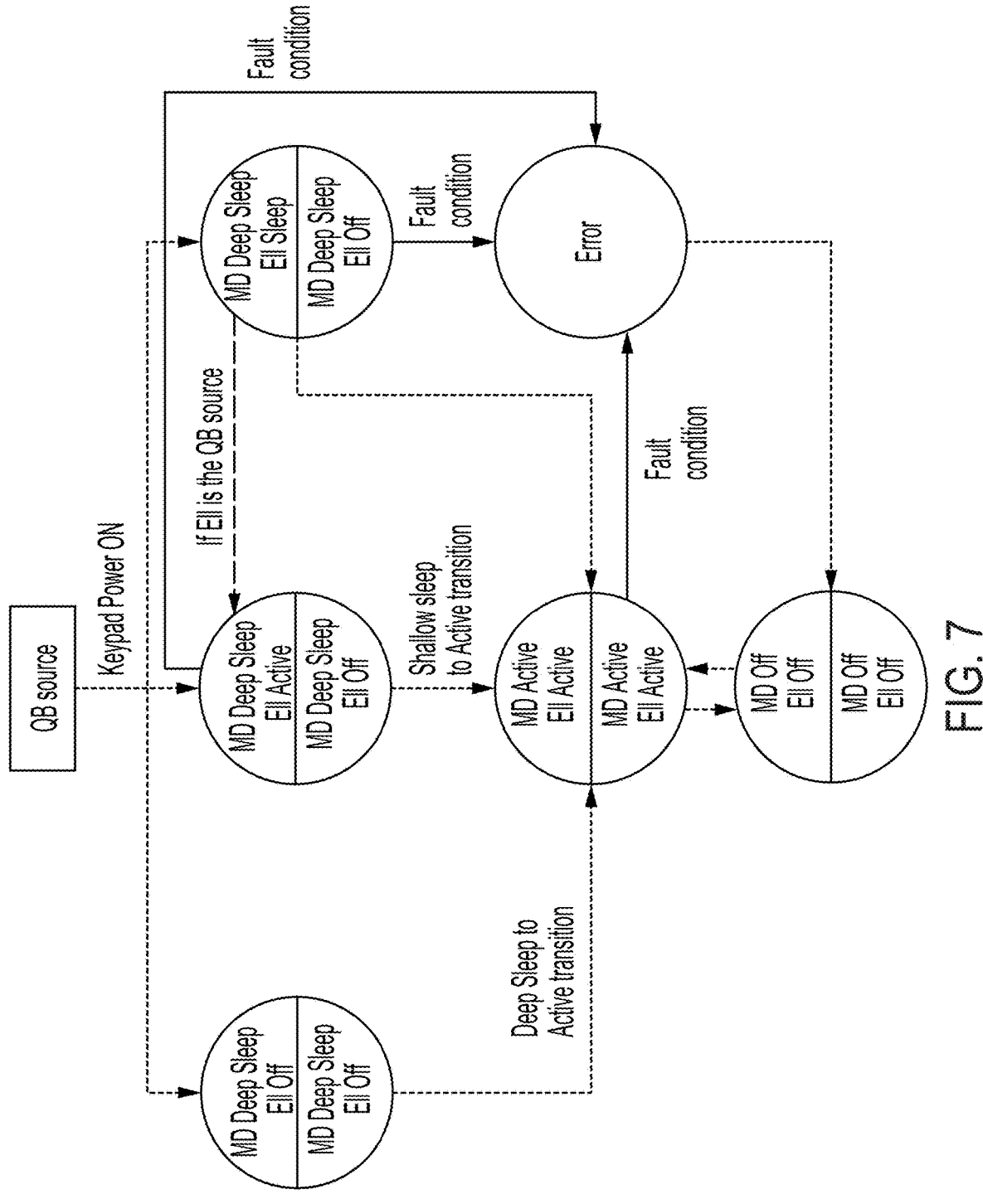
FIG. 7 is a multi-chiplet state transition flow diagram for active state transition according to one or more aspects of the disclosure.

FIG. 7 is a multi-chiplet state transition flow diagram for active state transition according to one or more aspects of the disclosure. The flow diagram shows multi-chiplet SoC state transitions to exit the sleep state. For example, the exit procedure (e.g., the quick boot) from the sleep state may be triggered when the processor 401 receives an input (e.g., a user input to press a power-on button, a system input to perform a periodic processing task, or any other suitable input). In some examples, when the processor 401 receives an input, the processor is in the sleep state (e.g., the main domains of both chiplets are in the sleep state and the separate domains of both chiplets are in the off state). Then, the processor 401 may transition to the active state. In further examples, when the processor receives an input, the processor 401 may be in the partial sleep state. Then, the processor may transition to the active state. When a fault condition is detected, the processor may transition to an error state. Then, the processor 401 may transition to the off state and transition from the off state to the active state.

Figure 8:
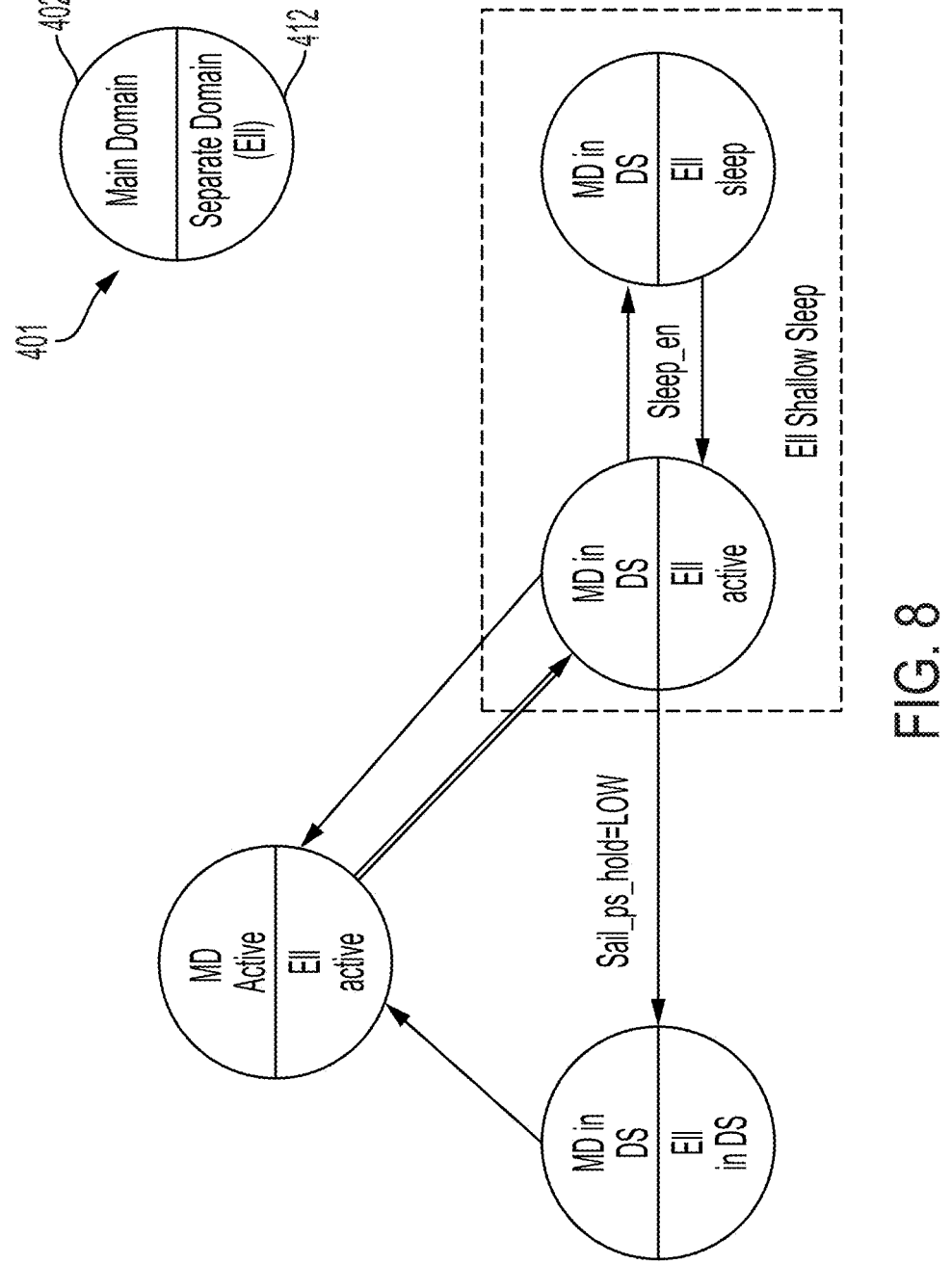
FIG. 8 is a schematic diagram illustrating entry of a partial sleep state according to one or more aspects of the disclosure.

FIG. 8 is a schematic diagram illustrating entry of a partial sleep state according to one or more aspects of the disclosure. For example, to transition the processor 401 from the active state to the partial sleep state, the processor 401 may transition the main domain from the active state to the sleep state (e.g., the first sleep state) and maintain the active state of the separate domain.

Figure 9:
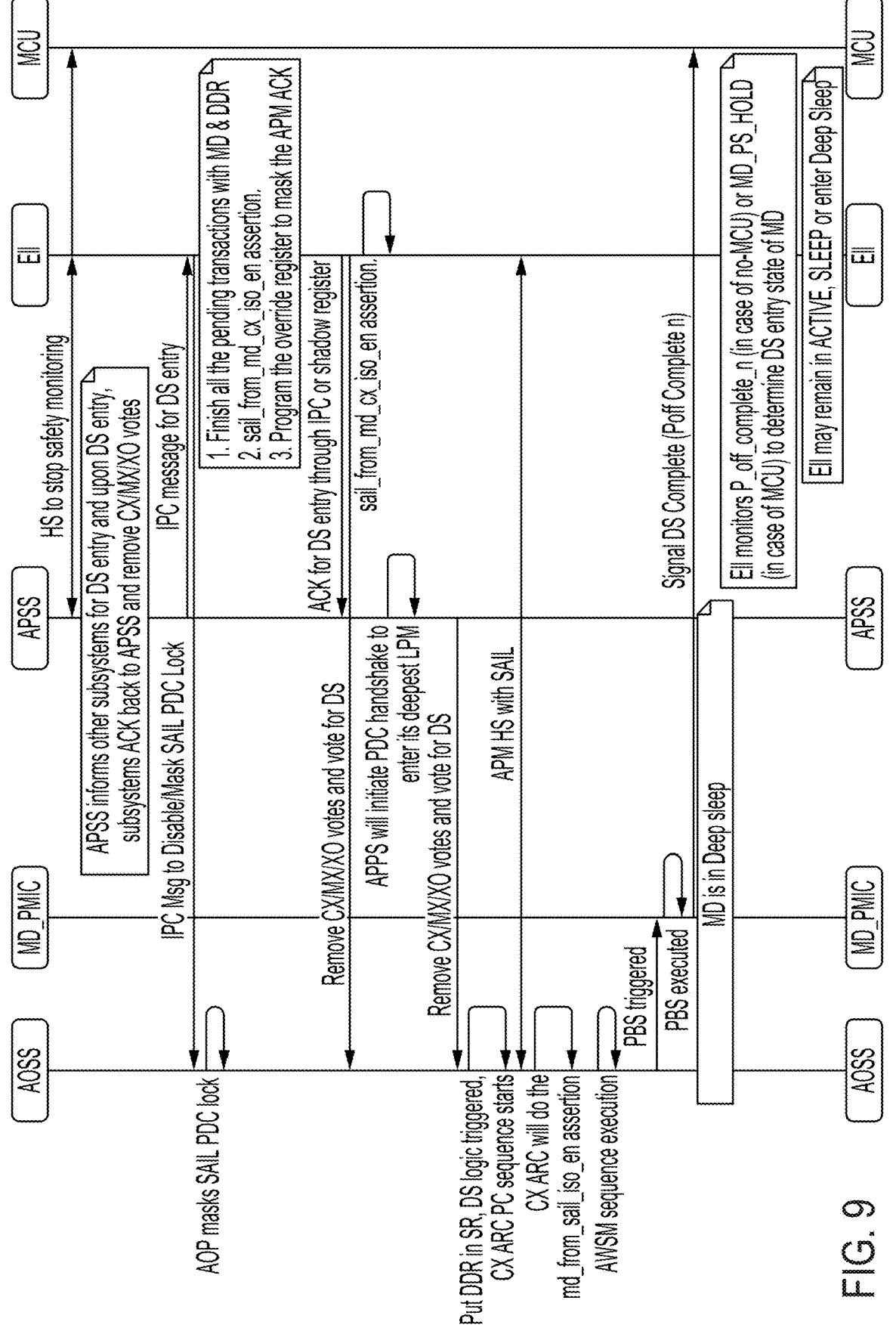
FIG. 9 is a call diagram illustrating entry of a partial sleep state according to one or more aspects of the disclosure.

FIG. 9 is a call diagram illustrating entry of a partial sleep state according to one or more aspects of the disclosure. In the call diagram, the processor 401 may include the main domain (e.g., AOSS 408 and an application processor subsystem (APSS)) and the separate domain (e.g., EII or SAIL). The main domain PMIC (MD_PMIC) may correspond to the main domain PMIC 426, and the MCU may correspond to the MCU 432 in FIG. 4. When the call diagram begins, the main domain 406 and the separate domain 404 may be in the active state. To transition the main domain 406 to the sleep state (e.g., the first sleep state) and maintain the active state of the separate domain 404, the APSS or a central processing unit (CPU) running on the main domain may receive an indication to enter the sleep state or the partial sleep state from the MCU. A handshake to stop monitoring the safety of the processor among the MCU, the APSS, and the separate domain may be performed. Then, the APSS may inform other subsystems in the main domain of the sleep state entry. When the subsystems entered the sleep state (e.g., the first sleep state), the APSS may receive acknowledgement indications from the subsystems indicating that the subsystems terminated the current workload and entered the sleep state or the low power mode. To avoid a situation where the separate domain flags the sleep state of the subsystems of the main domain as a fault condition and communicate with the MCU, the following steps may be performed.

When the handshake with the separate domain is performed, all subsystems on the chiplet (e.g., a single chiplet or both primary and secondary chiplets) may enter the sleep state (e.g., the first sleep state). Then, the APSS may send an inter-process communication (IPC) message to the subsystems and may receive an acknowledgement indicating that the subsystems are in the sleep states. As part of the sleep state entry, multiple shared resources that these subsystems utilize may exist. For example, the shared resources may include a core logic (CX) rail, a memory (MX) rail, and/or a crystal oscillator (XO) rail. In some examples, the CX rail may power or carry a certain voltage to the core logic of the subsystems while the MX rail may power or carry a certain voltage to the memory 420 of the subsystems. The subsystems may cast or send votes for the rails. Each vote may indicate a request for certain resources. For example, a vote may be a request for an operating voltage of the CX rail while another vote may be a request for an operating voltage of the MX rail. Those votes of the rails may be removed to indicate the subsystems are not in any power states as the subsystem collapses (e.g., the subsystem is in the off state). In some examples, power collapsing of the subsystem may indicate terminating the active tasks that are running on the subsystem, disabling the wakeup interrupts, terminating the memory access, and/or unvoting the shared resources. In some examples, to remove the votes, the subsystems may stop casting the votes for the rails. In other example, the APSS may not receive the votes for the rails when the subsystems are in the sleep states. Thus, the APSS receives the acknowledgement to indicate the votes for the shared resources are removed and the subsystems are in the deep sleep state. Then, the APSS may inform the separate domain to enter the sleep state.

The separate domain may finish any of the transactions with the main domain and remove votes for shared sources (e.g., by stopping to cast votes for the shared resources).

Thus, the main domain may enter the sleep state. In some examples, for the main domain to enter a complete deep sleep state, the operating system (OS) may be in the sleep state. To provision that, all shared resource votes may be removed, and the CX rail may be collapsed (e.g., votes are not sent using the CX rail). In some examples, collapsing the CX rail may indicate that the CX rail may be turned off to save the power. For example, after all subsystems and the APSS remove the votes for the CX rail not to have any active votes for the CX rail to have a higher level of voltage, the CX rail may be turned off. On the separate domain side, the separate domain may hold the votes for the CX and XO resources until the separate domain receives the IPC message indicating that the subsystems transition to the sleep state. As a response to the IPC message of the sleep state, the separate domain may remove the votes. Thus, the separate domain may be isolated the main domain, and the main domain is ready to enter the sleep state. After the separate domain removes the votes, the APSS on the main domain may remove the resource votes and enter the sleep state.

The AOSS, which is configured to aggregate all shared resource votes, may recognize that all shared resource votes are removed. Because no active subsystem exists on the main domain, the main domain may enter the sleep state. The AOSS may perform an AOSS sleep sequence to enter the sleep state.

As a part of this sleep sequence, since the separate domain is still on the same chiplet as the main domain, a proper electrical isolation may be performed between the main domain and the separate domain. Because the main domain collapses the CX rail, the separate domain may change any logic on the CX rail to the MX rail. For example, before the separate domain collapses the CX rail, no logic of the separate domain may be active on the CX rail to avoid any electrical and performance issues. Thus, before CX rail is collapsed, the separate domain logic that is running on CX rail may be changed to the MX rail. If the separate domain is in the first sleep state where both the CX and MX rails are collapsed, the handshake for the CX to MX rail switch can be overridden by the separate domain. Thus, for the CX to MX rail switch request from the AOSS, the separate domain may send an auto-acknowledgement (Auto-ACK) and maintain the sequence on the AOSS side to be common. For the change, the AOSS may perform a handshake with the separate domain. Once that handshake is fulfilled, the sleep sequence is executed on the main domain, and as a result of sleep sequence completion, the AOSS may triggers the sequence in the PMIC to turn off the rails of the processor 401. Thus, the main domain may enter the sleep state (e.g., the first sleep state) while the separate domain may be isolated from the main domain but be still in the active state.

The separate domain may monitor the state of the main domain. For example, the separate domain may monitor the entry of the sleep state of the main domain. In some examples, the separate domain may check a power state hold line, which indicates the power state of the main domain. If the power state hold line carries a low indication (e.g., a value of '0'), the main domain is in the sleep state (e.g., the first sleep state), and the separate domain may identify that the separate domain is the only domain in the active state.

Figure 10:
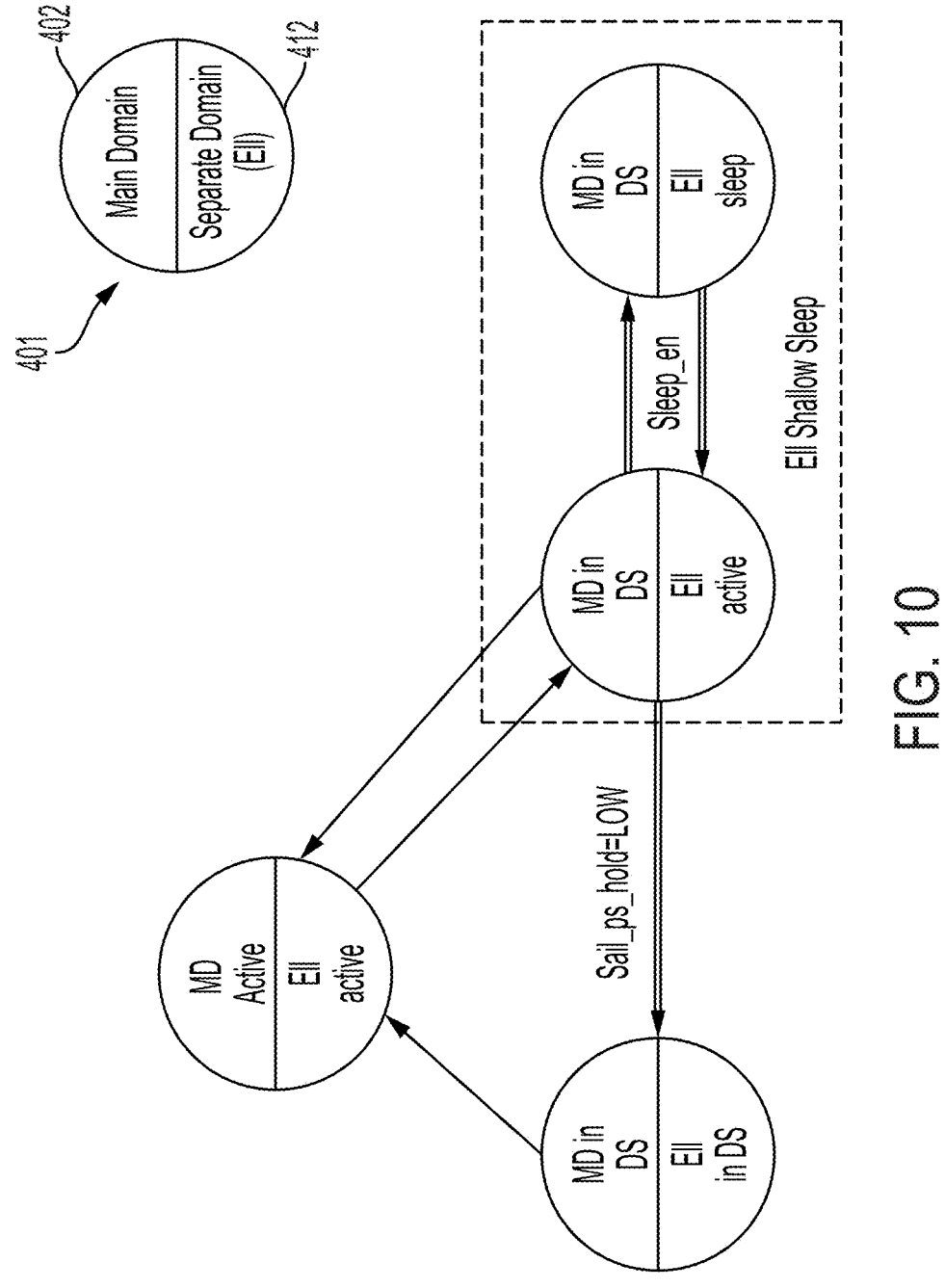
FIG. 10 is a schematic diagram illustrating state transitions of a partial sleep state according to one or more aspects of the disclosure.

FIG. 10 is a schematic diagram illustrating state transitions of a partial sleep state according to one or more aspects of the disclosure. For example, when the main domain is in the sleep state, the processor 401 may transition the separate domain 404 from the active state to the sleep state (e.g., the first sleep state or the second sleep state). When there are no workloads or processing requests for the separate domain 404 to perform, the separate domain 404 may enter the sleep state and exit out of the sleep state. In some examples, the sleep state that the separate domain 404 enters may be the second sleep state or the regular sleep state. However, the separate domain 404 may also completely enter the first sleep state or the deep sleep state if the separate domain 404 has not any workload. In some examples, the partial sleep state of the chiplet may indicate that the main domain 406 is in the first sleep state while the separate domain 404 is in the active state or the second sleep state. Also, in the partial sleep state, the separate domain 404 may transition from the active state to the sleep state (e.g., the second sleep state) and from the sleep state to the active state.

Figure 11:
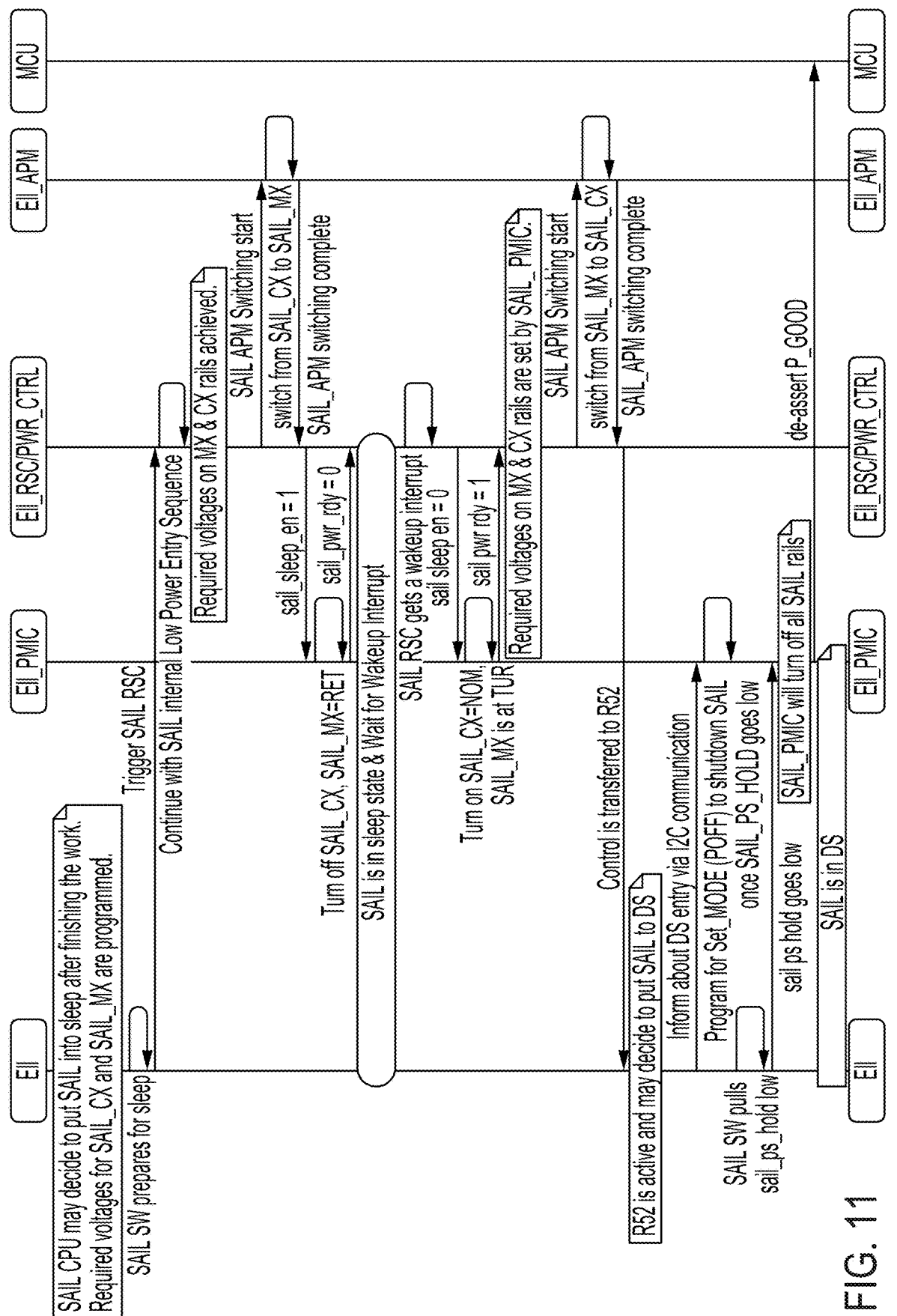
FIG. 11 is a call diagram illustrating state transitions of a partial sleep state according to one or more aspects of the disclosure.

FIG. 11 is a call diagram illustrating state transitions of a partial sleep state according to one or more aspects of the disclosure. In the call diagram, the separate domain (e.g., EII or SAIL) including a separate domain remote system controller (EII_RSC)/power controller (PWR_CTRL), and a separate domain advanced power module (EII_APM). The call diagram may also include external entities (e.g., the separate domain PMIC 422 (EII_PMIC)) and the MCU 432 in FIG. 4. When the call diagram begins, the main domain 406 is in the sleep state while the separate domain 404 are in the active state. In some examples, before the separate domain enters into the regular sleep, the CX and MX rails, which power the logic and memory portion of the separate domain, may be programmed to a desired voltage corner (e.g., lowering the voltages of the rails). When the voltage corners are programmed, the separate domain may be ready to enter a sleep state.

Then, the separate domain may trigger the power controller that is in the separate domain. The sale power controller may run a low power mode entry sequence once the trigger is provided. The power controller block may ensure that the voltages of the CX and MX rails are reached as programed. When the voltages for these rails are achieved, the advanced power module, which is in the separate domain, may switch from the CX domain to MX domain. In some examples, the switching may be performed in the sleep or the low power mode entry path. In the partial or shallow sleep, switching from the CX domain to the MX domain may be performed if the separate domain is entering the second sleep state because the CX rail of the separate domain is collapsed but the MX rail of the separate domain remains active. When the power mux switching is performed, the power controller may provide an indication indicating that the separate domain is ready to enter the sleep state (e.g., sail_sleep_en=1) to the separate domain PMIC 422 that powers the separate domain. Then, the separate domain PMIC 422 may turn off the CX rail and place the MX rail into the retention corner. For example, the separate domain PMIC 422 may not provide any voltage or provide 0 voltage on the CX rail and drop the voltage on the MX rail to a retention or nominal voltage. Then, the separate domain is in the second sleep state.

The second sleep is a short-term sleep. Thus, the separate domain may wait for a wakeup interrupt. For example, the separate domain may program a wakeup timer and may exit out of the sleep state after the timer expires. When the timer expires or the separate domain receives a wake-up interrupt through an external interface, the separate domain may perform steps opposite to the step to enter the sleep state described in FIGS. 8 and 9. For example, when the power controller of the separate domain receives the interrupt, the power controller may remove the sleep enable indication (e.g., sail_sleep_en=0) and transmit the indication to the separate domain PMIC 422. Then, the separate domain PMIC 422 may increase the voltage corners to the voltages in the active state and provide an acknowledgement indication (sail_pwr_rdy=1) to the power controller.

Then, the separate domain (e.g., the EII_APM) may perform the APM switching. For example, the separate domain may switch from the separate domain MX rail to the separate domain CX rail. Since the separate domain CX rail is at the normal voltage corner, the switching from the separate domain MX rail to the separate domain CX rail may be performed. Then, the separate domain APM may provide an acknowledgment to the power controller after the completion of the switching reversal. Now, the separate domain may be transitioned from the second sleep state to the active state.

The power controller block may transfer the control to separate domain software the separate domain can start running. Then, the separate domain may determine to transition to the first sleep state. The separate domain may inform the separate domain PMIC 4222 about the entry of the first sleep state. For example, the separate domain may provide a low power hold indication (e.g., sail_ps_hold=0) to the separate domain PMIC 422. In some examples, the indication may indicate the same low power hold indication may be the off state entry, the first sleep state entry, or not the error state. Then, the separate domain PMIC 422 may turn off all separate domain rails (e.g., the separate domain CX rail and the separate domain MX rail). In some examples, the deep sleep entry of the separate domain may be reported to the MCU. Thus, the separate domain may be in the first sleep state or deep sleep state.

Figure 12:
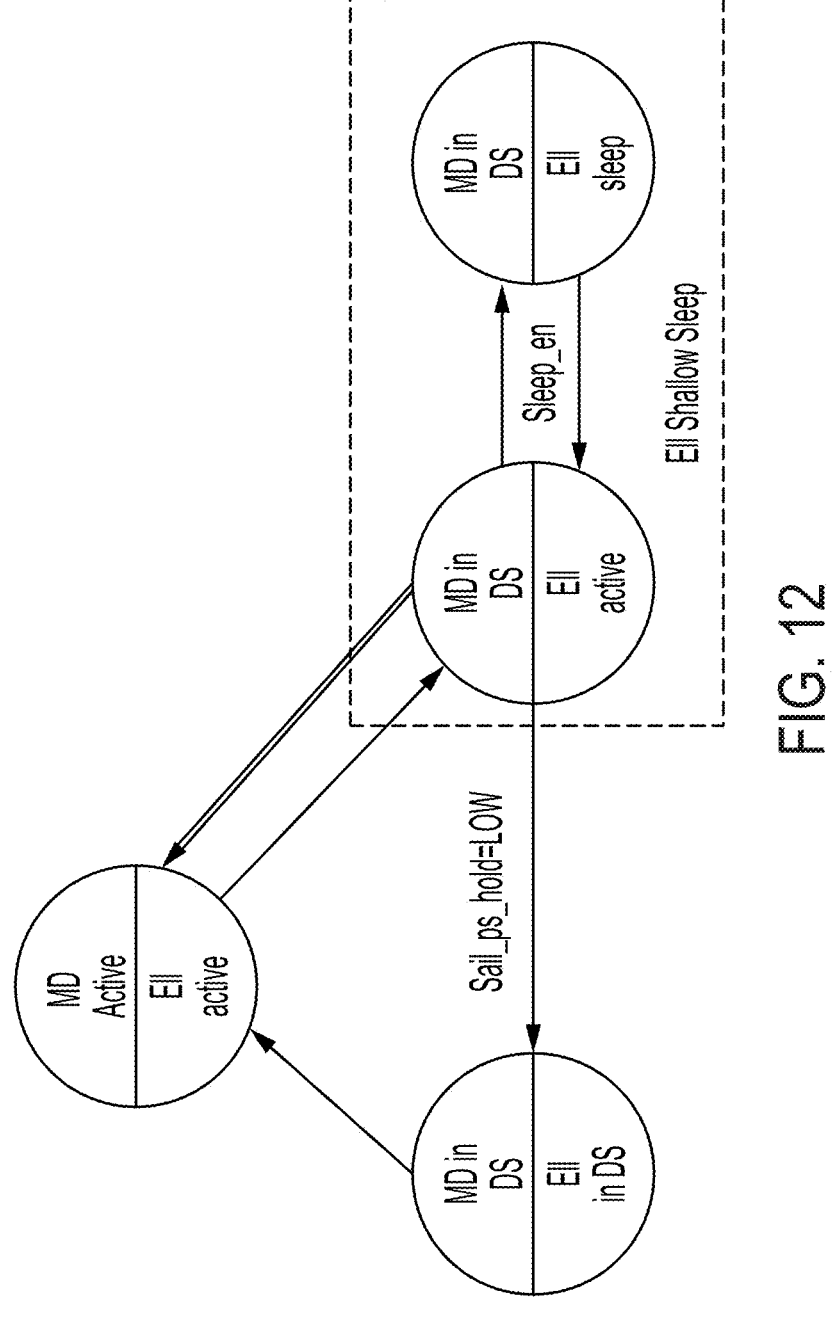
FIG. 12 is a schematic diagram illustrating a state transition to an active state according to one or more aspects of the disclosure.

FIG. 12 is a schematic diagram illustrating a state transition to an active state according to one or more aspects of the disclosure. For example, the processor 401 may transition the main domain from the sleep state (e.g., the first sleep state) to the active state and maintain the active state of the separate domain.

Figure 13:
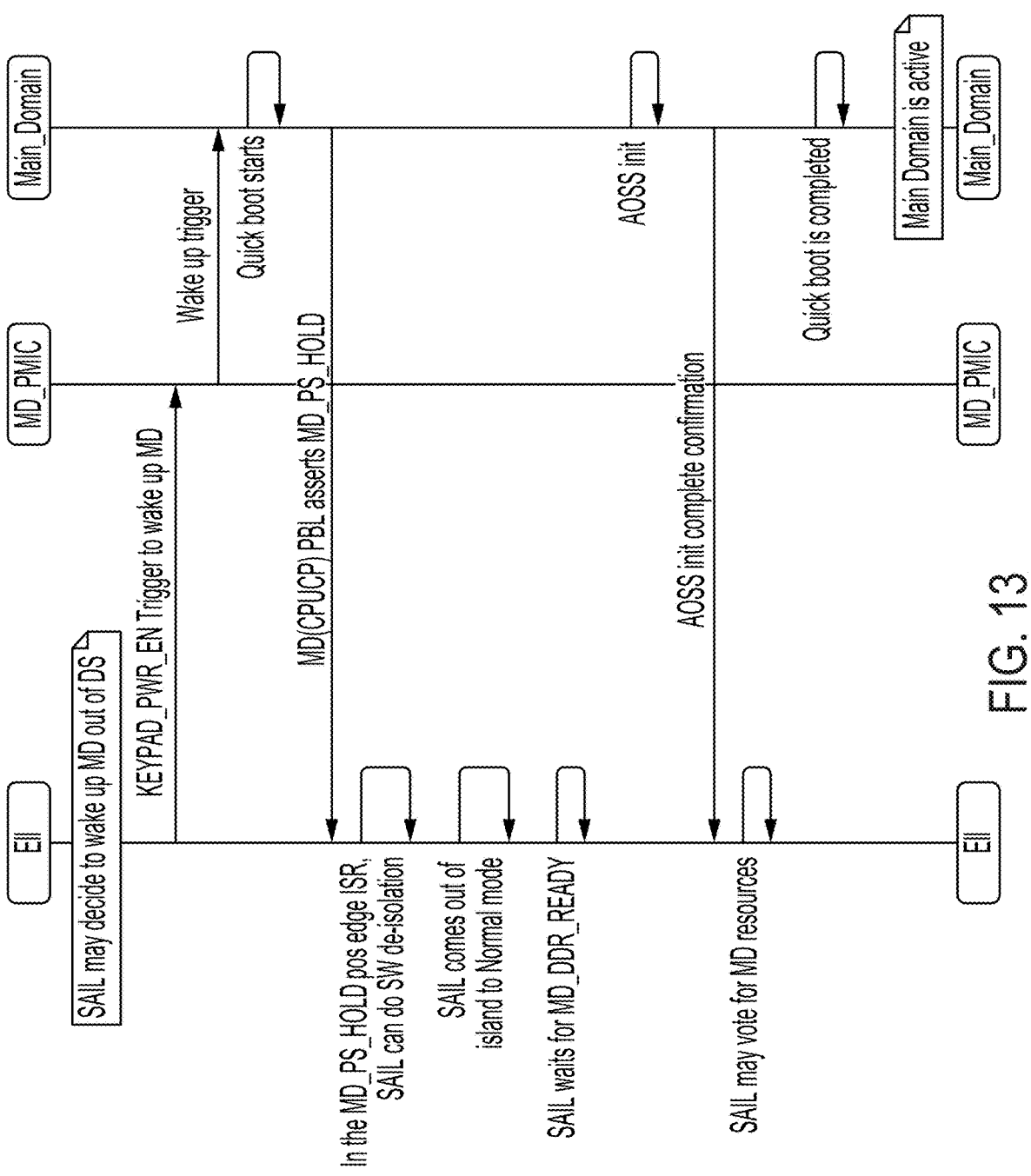
FIG. 13 is a call diagram illustrating a state transition to an active state according to one or more aspects of the disclosure.

FIG. 13 is a call diagram illustrating a state transition to an active state according to one or more aspects of the disclosure. The separate domain may decide to wake up the main domain out of the sleep state. When the main domain is in the sleep state, the separate domain may be in the active state to perform some workload and determine to wake up the main domain out of the sleep state. The separate domain may transmit a trigger to wake up the main domain to the main domain PMIC 426 that powers the main domain. Then, when the main domain PMIC 426 receives the trigger from the separate domain, the main domain PMIC 426 may transmit the trigger to the main domain. The main domain may begin the quick boot on the main domain. When the main domain starts the quick boot, the main domain may assert the main domain power state hold line (e.g., MD_PS_HOLD), which enable the separate domain to continuously monitor the main domain. Then, after the PS hold line is asserted, the separate domain may know that the main domain is powered up and it is safe for the separate domain to come out the isolation mode where the shared CX and RX rails are detached from the main domain. Then, the separate domain may start interacting with the main domain and start monitoring the safety of the main domain. Thus, the processor may transition from the partial sleep state to the active state.

One method of performing image processing according to embodiments described above is shown in FIG. 14. FIG. 14 is a flow chart illustrating an example method for a state transition to a partial sleep state for a main domain and a separate domain according to one or more aspects of the disclosure. Each of the operations described with reference to FIG. 14 may be performed by a processor 401 (e.g., the primary chiplet 402, the separate domain 404 of the primary chiplet 402, the main domain 406 of the primary chiplet 402, the secondary chiplet 412, the separate domain 414 of the secondary chiplet 412, the main domain 416 of the secondary chiplet 412, or any combination thereof) or a SoC. In other examples, the processor may include any other suitable device or integrated circuit to perform each of the operations in FIG. 14.

At block 1402, the processor receives an indication to enter a sleep state or a partial sleep state for a processor comprising a first main domain and a first separate domain coupled through a different power supply path than the first main domain. In some examples, the partial sleep state may correspond to the partial sleep state in FIG. 4, 8, or 9. The first main domain may correspond the main domain 406 of the primary chiplet 402 in FIG. 4 while the first separate domain may correspond the separate domain 404 of the primary chiplet 402 in FIG. 4. In some examples, the indication may be received from the MCU 432 in FIG. 4. In some examples, the indication to enter the sleep state or the partial sleep state for the process may indicate an indication to enter the first sleep state of the first main domain and/or the second sleep state of the first separate domain.

At block 1404, in response to the indication, the processor transitions the first main domain from the active state configured to perform an automotive function to a first sleep state while the first separate domain remains in an active state to monitor entry of the first sleep state of the first main domain. In some examples, the transitioning the first main domain to the first sleep state may include: when the first main domain is in an island state or an off state, transitioning the first main domain to the active state, and transitioning the first main domain from the active state to the sleep state. The state transitions of the processor before transitioning to the sleep state are described in FIG. 5 or 6. In some example the sleep state may correspond to the partial sleep state or the first sleep state in FIG. 4, 5, 8, or 9, and the first and second sleep states may correspond to the first and second sleep states, respectively, in FIG. 4 or 5. The second sleep state may be associated with a higher voltage than the first sleep state. Also, The active state may correspond to the active state in FIG. 4 or 5. In some examples, the automotive function may include transmission control, wireless communications, camera control, tracking control, adaptive cruise control, lane change assistance, collision avoidance, night vision, parking assistance, blind spot detection, or any other suitable function for a vehicle. In some examples, although the active state may be associated with a voltage level to perform the automotive function, the processor at block 1404 may not have a pending automotive function when the processor receives the indication. The active state of the main domain may be an intermediate power state to transition to the first sleep state.

In some examples, the first main domain may include a first subsystem and a second subsystem. The first subsystem may correspond to other subsystem(s) in FIG. 9 while the second subsystem may correspond to the APSS in FIG. 9. In such examples, in the sleep state, the first subsystem does not cast a first vote for a resource shared with the first separate domain and the first main domain, the first separate domain does not cast a second vote for the resource, the second subsystem does not cast a third vote for the resource, and the processor transmits, to a main domain PMIC, a request not to power the resource. In some examples, the first, second, and third votes may correspond to the vote from the other subsystem(s), the vote from the separate domain, and the vote from the APSS in FIG. 9, respectively. Also, the main domain PMIC may correspond to the main domain PMIC 426 in FIG. 4 or 9. In further examples, the resource may include at least one of: a core logic (CX) rail or a memory (MX) rail in FIG. 9.

In some examples, the first main domain and the first separate domain form a primary chiplet. The processor may further include a second main domain and a second separate domain coupled through a second power supply path different than a power supply path of the second main domain, wherein the second main domain and the second separate domain form a secondary chiplet. In some examples, the primary chiplet may correspond to the primary chiplet 402 while the secondary chiplet including the second main domain and the second separate domain may correspond to the secondary chiplet 412 including the main domain 416 and the separate domain 414 in FIG. 4. Also, the second different power supply path may correspond to a path to the secondary PMIC 424 in FIG. 4.

In some examples, the processor may further transition the secondary chiplet to a secondary power state based on the partial sleep state of the primary chiplet (e.g., the main domain being in the first sleep state and the first separate domain being in the active state or the second sleep state). For example, the state transition of the secondary chiplet in correspondence to the primary chiplet is described in FIG. 5. For example, when the primary chiplet is in the partial sleep state, the secondary power state may include the sleep state of the second main domain and an off state of the second separate domain. In some examples, the off state may correspond to the off state in FIG. 4 or 5.

At block 1406, after the entry of the first sleep state of the first main domain, the processor transitions the first separate domain in a second sleep state. In other examples, after the entry of the first sleep state of the first main domain, the processor transitions the first separate domain in the first sleep state. For example, when the first separate domain monitors the first main domain to enter the first sleep state, the first separate domain may maintain the active state. But after the entry of the first sleep state of the first main domain, the first separate domain may enter the first or second sleep state when no pending processing requests for the first separate domain exists. In some examples, the second sleep state may correspond to the second sleep state in FIG. 4 or 5. In such examples, to transition the first separate domain to the second sleep state, the processor may switch a core logic (CX) rail of the first separate domain to voltage corresponding to a memory (MX) rail of the first separate domain. The switching of CX rail of the first separate domain to the MX rail may be described in FIG. 11. In automotive applications, the disclosed method and system may transition multiple domains to safe power states to avoid any accidents related to malfunctional power state transitions.

It is noted that one or more blocks (or operations) described with reference to FIG. 14 may be combined with one or more blocks (or operations) described with reference to another of the figures. For example, one or more blocks (or operations) of FIG. 14 may be combined with one or more blocks (or operations) of FIGS. 1-4 and 6-13.

In one or more aspects, techniques for supporting vehicular operations may include additional aspects, such as any single aspect or any combination of aspects described below or in connection with one or more other processes or devices described elsewhere herein. In a first aspect, an apparatus comprises a memory storing processor-readable code; and at least one processor coupled to the memory, the at least one processor comprising a first main domain and a first separate domain coupled through a different power supply path than the first main domain, the at least one processor configured to execute the processor-readable code to cause the at least one processor to perform operations including: receiving an indication to enter a sleep state for the at least one processor; in response to the indication, transitioning the first main domain from an active state configured to perform an automotive function to a first sleep state while the first separate domain remains in the active state to monitor entry of the first sleep state of the first main domain; and after the entry of the first sleep state of the first main domain, transitioning the first separate domain in a second sleep state, the second sleep state associated with a higher voltage than the first sleep state. In some implementations, the apparatus includes a wireless device, such as a UE, or a vehicle. In some implementations, the apparatus may include at least one processor, and a memory coupled to the processor. The at least one processor may be configured to perform operations described herein with respect to the apparatus. In some other implementations, the apparatus may include a non-transitory computer-readable medium having program code recorded thereon and the program code may be executable by a computer for causing the computer to perform operations described herein with reference to the apparatus. In some implementations, the apparatus may include one or more means configured to perform operations described herein. In some implementations, a method of wireless communication may include one or more operations described herein with reference to the apparatus.

In a second aspect, in combination with the first aspect, the transitioning of the first main domain to the first sleep state comprise: in response to the first main domain being in an island state or an off state, transitioning the first main domain to the active state; and transitioning the first main domain from the active state to the first sleep state.

In a third aspect, in combination with one or more of the first aspect or the second aspect, the first main domain comprises a first subsystem and a second subsystem, in the first sleep state: the first subsystem does not cast a first vote for a resource shared with the first separate domain and the first main domain; the first separate domain does not cast a second vote for the resource; the second subsystem does not cast a third vote for the resource; and the at least one processor transmits, to a main domain power management integrated circuit (PMIC), a request not to power the resource.

In a fourth aspect, in combination with one or more of the first aspect through the third aspect, the resource comprises at least one of: a core logic (CX) rail or a memory (MX) rail.

In a fifth aspect, in combination with one or more of the first aspect through the fourth aspect, the first main domain and the first separate domain form a primary chiplet, wherein the at least one processor further comprises: a second main domain and a second separate domain coupled through a second power supply path different from a power supply path of the second main domain, wherein the second main domain and the second separate domain form a secondary chiplet, and wherein the at least one processor is configured to execute the processor-readable code to cause the at least one processor to perform the operations further including: transitioning the secondary chiplet to a secondary power state based on the partial sleep state of the primary chiplet.

In a sixth aspect, in combination with one or more of the first aspect through the fifth aspect, the secondary power state comprises the sleep state of the second main domain and an off state of the second separate domain.

In a seventh aspect, in combination with one or more of the first aspect through the sixth aspect, the transitioning of the first separate domain to the second sleep state comprises: switching a core logic (CX) rail of the first separate domain to voltage corresponding to a memory (MX) rail of the first separate domain.

In an eighth aspect, in combination with one or more of the first aspect through the seventh aspect, a method comprises: receiving an indication to enter a sleep state for at least one processor comprising a first main domain and a first separate domain coupled through a different power supply path than the first main domain; in response to the indication, transitioning, by the at least one processor, the first main domain from an active state configured to perform an automotive function to a first sleep state while the first separate domain remains in the active state to monitor entry of the first sleep state of the first main domain; and after the entry of the first sleep state of the first main domain, transitioning the first separate domain in a second sleep state, the second sleep state associated with a higher voltage than the first sleep state.

In a ninth aspect, in combination with one or more of the first aspect through the eighth aspect, a system comprises: a primary chiplet including a first main domain and a first separate domain, the first separate domain coupled through a different power supply path than the first main domain, wherein the first main domain is configured to: receive an indication to enter a sleep state for the primary chiplet; and in response to the indication, transition from an active state configured to perform an automotive function to a first sleep state while the first separate domain remains in the active state to monitor entry of the first sleep state of the first main domain, and wherein the first separate domain is configured to: after the entry of the first sleep state of the first main domain, communicate with a microcontroller unit (MCU); and transition to a second sleep state, the second sleep state associated with a higher voltage than the first sleep state.

In a tenth aspect, in combination with one or more of the first aspect through the ninth aspect, the first main domain is configured to: in response to the first main domain being in an island state or an off state, transition to the active state; and transition from the active state to the first sleep state.

In an eleventh aspect, in combination with one or more of the first aspect through the tenth aspect, the first main domain comprises a first subsystem and a second subsystem, wherein in the first sleep state: the first subsystem does not cast a first vote for a resource shared with the first separate domain and the first main domain; the first separate domain does not cast a second vote for the resource; the second subsystem does not cast a third vote for the resource; and the first main domain transmits, to a main domain power management integrated circuit (PMIC), a request not to power the resource.

In a twelfth aspect, in combination with one or more of the first aspect through the tenth aspect, the system further comprises: a secondary chiplet comprising: a second main domain and a second separate domain coupled through a second power supply path different from a power supply path of the second main domain, the secondary chiplet is configured to transition to a secondary power state based on the sleep state of the primary chiplet.

In a thirteenth aspect, in combination with one or more of the first aspect through the twelfth aspect, the secondary power state comprises the sleep state of the second main domain and an off state of the second separate domain.

In a fourteenth aspect, in combination with one or more of the first aspect through the thirteenth aspect, the first separate domain is configured to switch a core logic (CX) rail of the first separate domain to voltage corresponding to a memory (MX) rail of the first separate domain.

Components, the functional blocks, and the modules described herein with respect to FIGS. 1-14 include processors, electronics devices, hardware devices, electronics components, logical circuits, memories, software codes, firmware codes, among other examples, or any combination thereof. Software shall be construed broadly to mean instructions, instruction sets, code, code segments, program code, programs, subprograms, software modules, application, software applications, software packages, routines, subroutines, objects, executables, threads of execution, procedures, and/or functions, among other examples, whether referred to as software, firmware, middleware, microcode, hardware description language or otherwise. In addition, features discussed herein may be implemented via specialized processor circuitry, via executable instructions, or combinations thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Skilled artisans will also readily recognize that the order or combination of components, methods, or interactions that are described herein are merely examples and that the components, methods, or interactions of the various aspects of the present disclosure may be combined or performed in ways other than those illustrated and described herein.

The various illustrative logics, logical blocks, modules, circuits and algorithm processes described in connection with the implementations disclosed herein may be implemented as electronic hardware, computer software, or combinations of both. The interchangeability of hardware and software has been described generally, in terms of functionality, and illustrated in the various illustrative components, blocks, modules, circuits and processes described above. Whether such functionality is implemented in hardware or software depends upon the particular application and design constraints imposed on the overall system.

The hardware and data processing apparatus used to implement the various illustrative logics, logical blocks, modules and circuits described in connection with the aspects disclosed herein may be implemented or performed with a general purpose single-or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, or, any conventional processor, controller, microcontroller, or state machine. In some implementations, a processor may be implemented as a combination of computing devices, such as a combination of a DSP and a microprocessor, a plurality of microprocessors, one or more microprocessors in conjunction with a DSP core, or any other such configuration. In some implementations, particular processes and methods may be performed by circuitry that is specific to a given function.

In one or more aspects, the functions described may be implemented in hardware, digital electronic circuitry, computer software, firmware, including the structures disclosed in this specification and their structural equivalents thereof, or in any combination thereof. Implementations of the subject matter described in this specification also may be implemented as one or more computer programs, which is one or more modules of computer program instructions, encoded on a computer storage media for execution by, or to control the operation of, data processing apparatus.

If implemented in software, the functions may be stored on or transmitted over as one or more instructions or code on a computer-readable medium. The processes of a method or algorithm disclosed herein may be implemented in a processor-executable software module which may reside on a computer-readable medium. Computer-readable media includes both computer storage media and communication media including any medium that may be enabled to transfer a computer program from one place to another. A storage media may be any available media that may be accessed by a computer. By way of example, and not limitation, such computer-readable media may include random-access memory (RAM), read-only memory (ROM), electrically erasable programmable read-only memory (EEPROM), CD-ROM or other optical disk storage, magnetic disk storage or other magnetic storage devices, or any other medium that may be used to store desired program code in the form of instructions or data structures and that may be accessed by a computer. Also, any connection may be properly termed a computer-readable medium. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and instructions on a machine readable medium and computer-readable medium, which may be incorporated into a computer program product.

Various modifications to the implementations described in this disclosure may be readily apparent to those skilled in the art, and the generic principles defined herein may be applied to some other implementations without departing from the spirit or scope of this disclosure. Thus, the claims are not intended to be limited to the implementations shown herein but are to be accorded the widest scope consistent with this disclosure, the principles and the novel features disclosed herein.

Certain features that are described in this specification in the context of separate implementations also may be implemented in combination in a single implementation. Conversely, various features that are described in the context of a single implementation also may be implemented in multiple implementations separately or in any suitable subcombination. Moreover, although features may be described above as acting in certain combinations and even initially claimed as such, one or more features from a claimed combination may in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one more example processes in the form of a flow diagram. However, other operations that are not depicted may be incorporated in the example processes that are schematically illustrated. For example, one or more additional operations may be performed before, after, simultaneously, or between any of the illustrated operations. In certain circumstances, multitasking and parallel processing may be advantageous. Moreover, the separation of various system components in the implementations described above should not be understood as requiring such separation in all implementations, and it should be understood that the described program components and systems may generally be integrated together in a single software product or packaged into multiple software products. Additionally, some other implementations are within the scope of the following claims. In some cases, the actions recited in the claims may be performed in a different order and still achieve desirable results.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method, comprising:
receiving an indication to enter a sleep state for at least one processor comprising a first main domain and a first separate domain coupled through a different power supply path than the first main domain;
in response to the indication, transitioning, by the at least one processor, the first main domain from an active state configured to perform an automotive function to a first sleep state while the first separate domain remains in the active state to monitor entry of the first sleep state of the first main domain, wherein the transitioning of the first main domain to the first sleep state comprise:
in response to the first main domain being in an island state or an off state, transitioning, by the at least one processor, the first main domain to the active state; and
transitioning the first main domain from the active state to the first sleep state; and
after the entry of the first sleep state of the first main domain, transitioning the first separate domain to a second sleep state, the second sleep state associated with a higher voltage than the first sleep state.

2. The method of claim 1, wherein the first main domain comprises a first subsystem and a second subsystem, wherein in the first sleep state:
the first subsystem does not cast a first vote for a resource shared with the first separate domain and the first main domain;
the first separate domain does not cast a second vote for the resource;
the second subsystem does not cast a third vote for the resource; and the at least one processor transmits, to a main domain power management integrated circuit (PMIC), a request not to power the resource.

3. The method of claim 2, wherein the resource comprises at least one of: a core logic (CX) rail or a memory (MX) rail.

4. The method of claim 1, wherein the first main domain and the first separate domain form a primary chiplet,
wherein the at least one processor further comprises: a second main domain and a second separate domain coupled through a second power supply path different from a power supply path of the second main domain,
wherein the second main domain and the second separate domain form a secondary chiplet, and
wherein the method further comprises:
transitioning, by the at least one processor, the secondary chiplet to a secondary power state based on the sleep state of the primary chiplet.

5. The method of claim 4, wherein the secondary power state comprises the sleep state of the second main domain and an off state of the second separate domain.

6. The method of claim 1, wherein the transitioning of the first separate domain to the second sleep state comprises:
switching a core logic (CX) rail of the first separate domain to voltage corresponding to a memory (MX) rail of the first separate domain.

7. An apparatus, comprising:
a memory storing processor-readable code; and
at least one processor coupled to the memory, the at least one processor comprising a first main domain and a first separate domain coupled through a different power supply path than the first main domain, the at least one processor configured to execute the processor-readable code to cause the at least one processor to perform operations including:
receiving an indication to enter a sleep state for the at least one processor;
in response to the indication, transitioning the first main domain from an active state configured to perform an automotive function to a first sleep state while the first separate domain remains in the active state to monitor entry of the first sleep state of the first main domain, wherein the transitioning of the first main domain to the first sleep state comprise:
in response to the first main domain being in an island state or an off state, transitioning the first main domain to the active state; and
transitioning the first main domain from the active state to the first sleep state; and
after the entry of the first sleep state of the first main domain, transitioning the first separate domain to a second sleep state, the second sleep state associated with a higher voltage than the first sleep state.

8. The apparatus of claim 7, wherein the first main domain comprises a first subsystem and a second subsystem, wherein in the first sleep state:
the first subsystem does not cast a first vote for a resource shared with the first separate domain and the first main domain;
the first separate domain does not cast a second vote for the resource;
the second subsystem does not cast a third vote for the resource; and
the at least one processor transmits, to a main domain power management integrated circuit (PMIC), a request not to power the resource.

9. The apparatus of claim 8, wherein the resource comprises at least one of:

a core logic (CX) rail or a memory (MX) rail.

10. The apparatus of claim 7, wherein the first main domain and the first separate domain form a primary chiplet,
  wherein the at least one processor further comprises: a second main domain and a second separate domain coupled through a second power supply path different from a power supply path of the second main domain,
  wherein the second main domain and the second separate domain form a secondary chiplet, and
  wherein the at least one processor is configured to execute the processor-readable code to cause the at least one processor to perform the operations further including:
    transitioning the secondary chiplet to a secondary power state based on the sleep state of the primary chiplet.

11. The apparatus of claim 10, wherein the secondary power state comprises the sleep state of the second main domain and an off state of the second separate domain.

12. The apparatus of claim 7, wherein the transitioning of the first separate domain to the second sleep state comprises:
  switching a core logic (CX) rail of the first separate domain to voltage corresponding to a memory (MX) rail of the first separate domain.

13. A system, comprising:
  a primary chiplet including a first main domain and a first separate domain, the first separate domain coupled through a different power supply path than the first main domain,
  wherein the first main domain is configured to:
    receive an indication to enter a sleep state for the primary chiplet;
    in response to the indication, transition from an active state configured to perform an automotive function to a first sleep state while the first separate domain remains in the active state to monitor entry of the first sleep state of the first main domain,
    in response to the first main domain being in an island state or an off state, transition to the active state; and transition from the active state to the first sleep state; and
  wherein the first separate domain is configured to:
    after the entry of the first sleep state of the first main domain, communicate with a microcontroller unit (MCU); and
    transition to a second sleep state, the second sleep state associated with a higher voltage than the first sleep state.

14. The system of claim 13, wherein the first main domain comprises a first subsystem and a second subsystem, and
  wherein in the first sleep state:
    the first subsystem does not cast a first vote for a resource shared with the first separate domain and the first main domain;
    the first separate domain does not cast a second vote for the resource;
    the second subsystem does not cast a third vote for the resource; and
    the first main domain transmits, to a main domain power management integrated circuit (PMIC), a request not to power the resource.

15. The system of claim 13, further comprising: a secondary chiplet comprising: a second main domain and a second separate domain coupled through a second power supply path different from a power supply path of the second main domain,
  wherein the secondary chiplet is configured to transition to a secondary power state based on the sleep state of the primary chiplet.

16. The system of claim 15, wherein the secondary power state comprises the sleep state of the second main domain and an off state of the second separate domain.

17. The system of claim 13, wherein the first separate domain is configured to switch a core logic (CX) rail of the first separate domain to voltage corresponding to a memory (MX) rail of the first separate domain.

* * * * *